(12) United States Patent
Igari et al.

(10) Patent No.: US 9,111,555 B2
(45) Date of Patent: Aug. 18, 2015

(54) OPTICAL RECORDING MEDIUM

(71) Applicant: Sony Corporation, Tokyo (JP)

(72) Inventors: Takahiro Igari, Miyagi (JP); Makoto Watanabe, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/256,103

(22) Filed: Apr. 18, 2014

(65) Prior Publication Data

US 2014/0322476 A1 Oct. 30, 2014

(30) Foreign Application Priority Data

Apr. 26, 2013 (JP) .................. 2013-094785

(51) Int. Cl.
*G11B 7/24* (2013.01)
*G11B 7/2578* (2013.01)
*G11B 7/2433* (2013.01)
*G11B 7/257* (2013.01)
*G11B 7/258* (2013.01)
*G11B 7/243* (2013.01)

(52) U.S. Cl.
CPC ............ *G11B 7/2578* (2013.01); *G11B 7/2433* (2013.01); *G11B 2007/24308* (2013.01); *G11B 2007/24312* (2013.01); *G11B 2007/24314* (2013.01); *G11B 2007/24316* (2013.01); *G11B 2007/2571* (2013.01); *G11B 2007/2582* (2013.01); *G11B 2007/25706* (2013.01); *G11B 2007/25708* (2013.01); *G11B 2007/25715* (2013.01)

(58) Field of Classification Search
CPC ................ G11B 7/2433; G11B 7/257
See application file for complete search history.

(56) References Cited

U.S. PATENT DOCUMENTS

2010/0203280 A1* 8/2010 Ota et al. ................. 428/64.5

FOREIGN PATENT DOCUMENTS

WO WO 2008/018225 2/2008

* cited by examiner

*Primary Examiner* — Elizabeth Mulvaney
(74) *Attorney, Agent, or Firm* — Wolf, Greenfield & Sacks, P.C.

(57) ABSTRACT

An optical recording medium includes a recording layer including a reflective layer, two dielectric layers, and a phase-change recording layer. The phase-change recording layer-side dielectric layer of the two dielectric layers contains tantalum oxide or a composite oxide composed of silicon oxide, indium oxide, and zirconium oxide. The reflective layer-side dielectric layer of the two dielectric layers contains a composite oxide composed of silicon oxide, indium oxide, and zirconium oxide, a composite oxide composed of indium oxide and gallium oxide, or a composite oxide composed of zinc oxide and aluminum oxide.

6 Claims, 9 Drawing Sheets

OPTICAL RECORDING MEDIUM

CROSS REFERENCE TO RELATED APPLICATIONS

This application claims the benefit of Japanese Priority Patent Application JP 2013-094785 filed Apr. 26, 2013, the entire contents of which are incorporated herein by reference.

BACKGROUND

The present disclosure relates to an optical recording medium including a phase-change recording layer.

In recent years, a technique for multilayering a recording layer has been widely used in optical recording media in order to further increase storage capacity. Studies on the multilayering technique have been advanced for various optical recording media of a reproduction-only type, a write-once type, and a rewritable type.

A rewritable multilayered optical recording medium including a two-layer structure recording layer has been proposed, in which a first recording layer (L0 layer), an intermediate layer, a second recording layer (L1 layer), and a light-transmissive layer are stacked in that order on a substrate. The optical recording medium with a two-layer structure uses as the second recording layer a recording layer (properly referred to as a "semi-transmissive recording layer" hereinafter) which can transmit a laser beam used for recording/reproduction on/from the first recording layer.

The second recording layer includes a stack of a dielectric material, a metal, and a phase-change recording material, etc. so that recording/reproduction performance can be exhibited. Typically, the second recording layer has a structure in which a first dielectric layer, a metal reflective layer, a second dielectric layer, a phase-change recording layer, and a third dielectric layer are stacked in that order on a substrate (for example, refer to International Publication No. 2008/018225).

SUMMARY

It is desirable to provide an optical recording medium having good recording characteristics and being capable of suppressing the occurrence of a defect.

An optical recording medium according to an embodiment of the present disclosure includes a recording layer containing a reflective layer, two dielectric layers, and a phase-change recording layer. The phase-change recording layer-side dielectric layer of the two dielectric layers contains tantalum oxide or a composite oxide composed of silicon oxide, indium oxide, and zirconium oxide. The reflective layer-side dielectric layer of the two dielectric layers contains a composite oxide composed of silicon oxide, indium oxide, and zirconium oxide, a composite oxide composed of indium oxide and gallium oxide, or a composite oxide composed of zinc oxide and aluminum oxide.

An optical recording medium according to another embodiment of the present disclosure includes a recording layer containing a first dielectric layer, a reflective layer, a second dielectric layer, a phase-change recording layer, and a third dielectric layer. The second dielectric layer includes two dielectric layers, and the phase-change recording layer-side dielectric layer of the two dielectric layers contains tantalum oxide or a composite oxide composed of silicon oxide, indium oxide, and zirconium oxide. The reflective layer-side dielectric layer of the two dielectric layers contains a composite oxide composed of silicon oxide, indium oxide, and zirconium oxide, a composite oxide composed of indium oxide and gallium oxide, or a composite oxide composed of zinc oxide and aluminum oxide.

In the present technology, it is preferred that a recording layer is provided on a substrate, and a cover layer is provided on the recording layer. The thickness of the cover layer is not particularly limited, and the cover layer includes a substrate, a sheet, or a coating layer. Considering that a high-NA (numerical aperture) objective lens is used, a high-density optical recording medium preferably includes as a cover layer a light-transmissive thin layer such as a sheet or coating layer and has a configuration in which information signals are recorded or reproduced by irradiation with light from the light-transmissive layer side. In this case, an opaque substrate can also be used. An incidence surface of light used for recording or reproducing information signals is properly disposed on at least one of the cover layer-side surface and the substrate-side surface according to the format of the optical recording medium.

The optical recording medium includes a plurality of recording layers at least one of which is preferably a recording layer having the above-described configuration.

In the present technology, the recording layer having the above-described configuration is preferably a transmissive recording layer. The term "transmissive recording layer" refers to a recording layer configured to permit transmission of light used for recording or reproducing information signals so that recording or reproduction can be made on a recording layer disposed behind the transmissive recording layer as viewed from a light irradiation surface. The term "light irradiation surface" refers to, among the surfaces of the optical recording medium, a surface irradiated with light used for recording or reproducing information signals. Therefore, when a recording layer is the transmissive recording layer, the recording layer is provided in front of the innermost recording layer as viewed from the irradiation surface, the irradiation surface being irradiated with light used for recording or reproducing information signals.

The recording layer-side dielectric layer of the two dielectric layers preferably contains tantalum oxide in view of improvement of transmittance. The transmissive recording layer having this configuration is particularly preferably applied to an optical recording medium a multilayered structure including three or more layers. As a result, good optical characteristics and recording characteristics can be achieved.

In the present technology, the phase-change recording layer-side dielectric layer of the two dielectric layers contains tantalum oxide of a composite oxide composed of silicon oxide, indium oxide, and zirconium oxide, and thus a good crystallization promoting action can be imparted to the phase-change recording layer. The reflective layer-side dielectric layer of the two dielectric layers contains a composite oxide composed of silicon oxide, indium oxide, and zirconium oxide, a composite oxide composed of indium oxide and gallium oxide, or a composite oxide composed of zinc oxide and aluminum oxide, and thus the occurrence of a defect can be suppressed.

As described above, according to the present technology, an optical recording medium having good recording characteristics and being capable of suppressing the occurrence of a defect can be provided.

DETAILED DESCRIPTION OF EMBODIMENTS

Figure 1A:
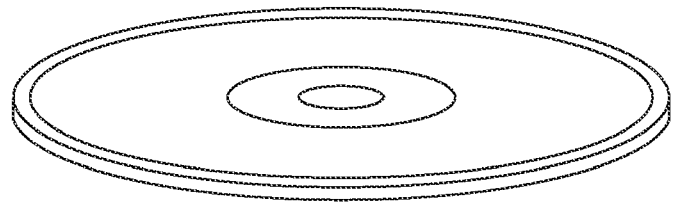
FIG. 1A is a perspective view showing an example of an appearance of an optical recording medium according to an embodiment of the present disclosure.

Embodiments of the present disclosure are described in the following order with reference to the drawings.

1 Summary
2 Configuration of optical recording medium
3 Method for manufacturing optical recording medium 1. Summary In an optical recording medium including a transmissive recording layer having a stacked film which includes a semi-transmissive reflective layer, a dielectric layer, and a phase-change recording layer, selection of a material of the dielectric layer is important for imparting good recording characteristics to the transmissive recording layer (semi-transmissive recording layer). An oxide material which imparts a crystallization promoting function to the phase-change recording layer is used as a material of the dielectric layer in contact with the phase-change recording layer. According to a finding of the inventors, tantalum oxide or a composite oxide composed of silicon oxide, indium oxide, and zirconium oxide is preferably used as the oxide material.

According to findings obtained from experiments by the inventors, in depositing the above-described oxide material by a sputtering method, the crystallization promoting performance of the phase-change recording layer can be more enhanced by adding oxygen to a deposition gas, thereby improving recording characteristics, for example, power margin, DOW (Direct Over Write) characteristics, etc.

However, when a dielectric layer is formed by adding oxygen to a deposition gas in the sputtering method as described above, deterioration occurs, particularly, in a peripheral portion of the semi-transmissive layer (for example, an Ag alloy layer) in contact with the dielectric layer, and thus good recording characteristics are not be obtained over the entire surface of the optical recording medium.

Accordingly, the inventors conducted study on a technology that can impart good crystallization promoting performance to a phase-change recording layer and achieve good recording characteristics over the entire surface of an optical recording medium. As a result, the inventors found a technology that two dielectric layers are formed in contact with a semi-transmissive reflective layer, and in depositing the semi-transmissive reflective layer-side lower dielectric layer of the two dielectric layers, oxygen is not added to deposition gas, while in depositing the phase-change recording layer-side upper dielectric layer, oxygen is added to deposition gas.

However, the inventors studied the characteristics of an optical recording medium including two dielectric layers as described above by conducting a reliability test of the optical recording medium, leading to the following finding. When silicon nitride (SiN) or a composite oxide (ITO) composed of indium oxide and tin oxide is selected as a material of the lower dielectric layer, a defect occurs in a transmissive recording layer.

Therefore, the inventors keenly studied for suppressing the occurrence of a defect. As a result, the inventors led to a finding that the occurrence of a defect can be suppressed by using, as a material of the lower dielectric layer, a composite oxide composed of silicon oxide, indium oxide, and zirconium oxide, a composite oxide composed of indium oxide and gallium oxide, or a composite oxide composed of zinc oxide and aluminum oxide.

2. Configuration of Optical Recording Medium

As shown in FIG. 1A, an optical recording medium 10 according to an embodiment of the present disclosure has a disc-like shape having an aperture (referred to as a "center hole" hereinafter) provided at a center thereof. The shape of the optical recording medium 10 is not limited to this example, and a card shape may be used.

Figure 1B:
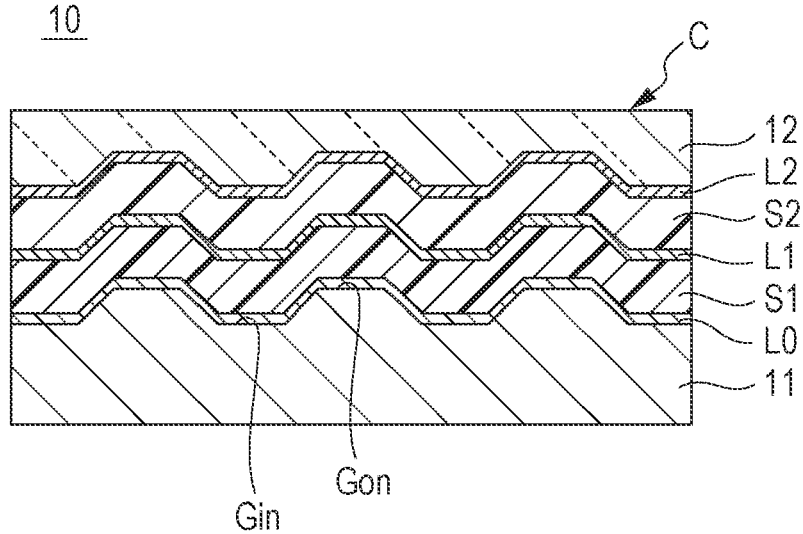
FIG. 1B is a schematic sectional view showing an example of a configuration of an optical recording medium according to an embodiment of the present disclosure.

As shown in FIG. 1B, the optical recording medium 10 has a configuration in which a recording layer L0, an intermediate layer S1, a recording layer L1, an intermediate layer S2, a recording layer L2, and a light-transmissive layer 12 serving as a cover layer are stacked in that order on a main surface of a substrate 11. The optical recording medium 10 is a three-layer rewritable optical recording medium where data can be erased and rewritten.

In the optical recording medium 10, information signals are recorded or reproduced by irradiating each of the recording layers L0 to L2 with a laser beam from the surface C on the light-transmissive layer 12 side. A laser beam having a wavelength within a range of 400 nm or more and 410 nm or less is converged by an objective lens having a numerical aperture within a range of 0.84 or more and 0.86 or less and applied to each of the recording layers L0 to L2 from the light-transmissive layer 12 side, recording or reproducing information signals. An example of the optical recording medium 10 is three-layer BD-RE (Blu-ray Disk Rewritable). The surface C irradiated with the laser beam for recording or reproducing information signals on or from each of the recording layers L0 to L2 is referred to as the "beam irradiation surface C".

The substrate 11, the recording layers L0 to L2, the intermediate layers S1 and S2, and the light-transmissive layer 12 which constitute the optical recording medium 10 are described in order below.

(Substrate 11)

The substrate 11 has, for example, a disc shape having a center hole provided at a center thereof. A main surface of the substrate 11 is, for example, a concave-convex surface on which the recording layer L0 is formed. Hereinafter, in the concave-convex surface, concave portions are referred to as "in-grooves Gin", and convex portions are referred to as "on-grooves Gon".

Examples of the shape of the in-grooves Gin and the on-grooves Gon include various shapes such as a spiral shape, a concentric circular shape, and the like. The in-grooves Gin and/or the on-grooves Gon are wobbled for stabilizing a linear velocity and adding address information.

For example, 120 mm is selected as the diameter of the substrate 11. In view of rigidity, preferably 0.3 mm or more and 1.3 mm or less, more preferably 0.6 mm or more and 1.3 mm or less, for example, 1.1 mm is selected as the thickness of the substrate 11. For example, 15 mm is selected as the diameter of the center hole.

For example, a plastic material or glass can be used as a material of the substrate 11, and a plastic material is preferably used in view of cost. Examples of the plastic material which can be used include polycarbonate resins, polyolefin resins, acrylic resins, and the like.

(Recording Layer L0)

Figure 2A:
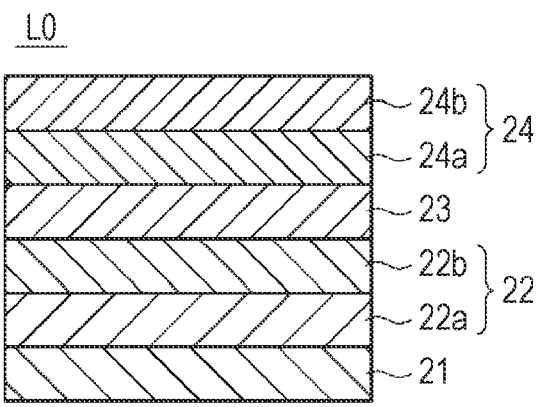
FIG. 2A is a schematic view showing an example of a configuration of a recording layer L0 shown in FIG. 1B.

As shown in FIG. 2A, the recording layer L0 includes a stacked film formed by, for example, stacking a reflective layer 21, a first dielectric layer 22, a phase-change recording layer 23, and a second dielectric layer 24 in that order on the substrate 11. The first dielectric layer 22 has a two-layer structure in which a lower dielectric layer 22a and an upper dielectric layer 22b are stacked. The lower dielectric layer 22a is provided on the reflective layer 21 side, and the upper dielectric layer 22b is provided on the phase-change recording layer 23 side. The second dielectric layer 24 has a two-layer structure in which a lower dielectric layer 24a and an upper dielectric layer 24b are stacked. The lower dielectric layer 24a is provided on the phase-change recording layer 23 side, and the upper dielectric layer 24b is provided on the intermediate layer S1 side.

Examples of a material which constitutes the reflective layer 21 include materials each containing an elemental such as Al, Ag, Au, Ni, Cr, Ti, Pd, Co, Si, Ta, W, Mo, or Ge, or an alloy thereof as a main component. Among these, Al-based, Ag-based, Au-based, Si-based, and Ge-based materials are preferred in view of practicability. Preferred examples of the alloy include Al—Ti, Al—Cr, Al—Cu, Al—Mg—Si, Ag—Nd—Cu, Ag—Pd—Cu, Ag—Pd—Ti, and Si—B. The material is preferably selected from these materials in view of optical characteristics and thermal characteristics. For example, in view of high reflectance even in a short-wavelength region, an Al-based or Ag-based material is preferably used.

The lower dielectric layer 22a, the upper dielectric layer 22b, the lower dielectric layer 24a, and the upper dielectric layer 24b are layers which protect the phase-change recording layer 23 and also control optical characteristics and thermal stability. A dielectric material which constitutes these dielectric layers 22a, 22b, 24a, and 24b contains, for example, at least one selected from the group consisting of oxides, nitrides, sulfides, carbides, and fluorides. An example of oxides is an oxide of at least one element selected from the group consisting of In, Zn, Sn, Al, Si, Ge, Ti, Ga, Ta, Nb, Hf, Zr, Cr, Bi, and Mg. An example of nitrides is a nitride of at least one element selected from the group consisting of In, Sn, Ge, Cr, Si, Al, Nb, Mo, Ti, Nb, Mo, Ti, W, Ta, and Zn, and preferably a nitride of at least one element selected from the group consisting of Si, Ge, and Ti. An example of sulfides is a Zn sulfide. An example of carbides is a carbide of at least one element selected from the group consisting of In, Sn, Ge, Cr, Si, Al, Ti, Zr, Ta, and W, and preferably a nitride of at least one element selected from the group consisting of Si, Ti, and W. An example of fluorides is a fluoride of at least one element selected from the group consisting of Si, Al, Mg, Ca, and La. Examples of a mixture include $ZnS$—$SiO_2$, $SiO_2$—$In_2O_3$—$ZrO_2$ (SIZ), $SiO_2$—$Cr_2O_3$—$ZrO_2$ (SCZ), $In_2O_3$—$SnO_2$ (ITO), $In_2O_3$—$CeO_2$ (ICO), $In_2O_3$—$Ga_2O_3$ (IGO), $In_2O_3$—$Ga_2O_3$—$ZnO$ (IGZO), $Sn_2O_3$—$Ta_2O_5$ (TTO), $TiO_2$—$SiO_2$, $Al_2O_3$—$ZnO$, $Al_2O_3$—$BaO$, and the like.

The phase-change recording layer 23 is a recording layer on which information signals can be repeatedly recorded by, for example, irradiation of a laser beam. Specifically, the phase-change recording layer 23 is a recording layer on which information signals are recorded and rewritten by, for example, reversibly changing between an amorphous phase and a crystal phase through laser beam irradiation. For example, a eutectic phase-change material or a compound-based phase-change material can be used as a material of the phase-change recording layer 23. Examples of the phase-change material include phase-change materials containing GeSbTe, SbTe, BiGeTe, BiGeSbTe, AgInSbTe, or GeSnSbTe as a main component. If required, at least one of metallic material such as Ag, In, Cr, and Mn may be added to the phase-change material containing such a main component.

(Recording Layer L1)

Figure 2B:
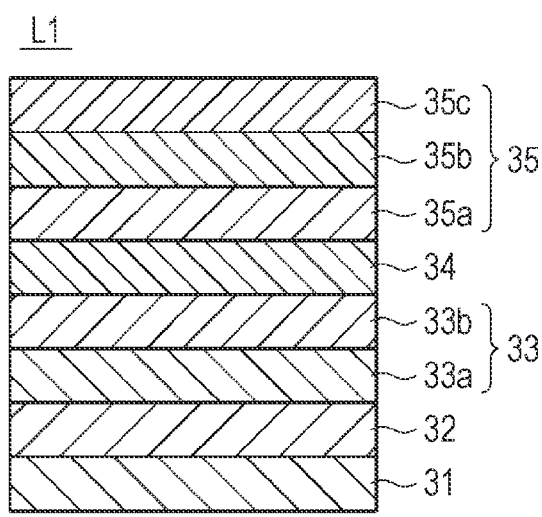
FIG. 2B is a schematic view showing an example of a configuration of a recording layer L1 shown in FIG. 1B.

As shown in FIG. 2B, the recording layer L1 is an example of transmissive recording layers, and includes, for example, a stacked film formed by stacking a first dielectric layer 31, a semi-transmissive reflective layer 32, a second dielectric layer 33, a phase-change recording layer 34, and a third dielectric layer 35 in that order on the intermediate layer S1.

The second dielectric layer 33 has a two-layer structure in which a lower dielectric layer 33a and an upper dielectric layer 33b are stacked. The lower dielectric layer 33a is provided on the semi-transmissive reflecting provided on the phase-change recording layer 34 side.

The third dielectric layer 35 has a three-layer structure in which a lower dielectric layer 35a, an intermediate dielectric layer 35b, and an upper dielectric layer 35c are stacked. The lower dielectric layer 35a is provided on the phase-change recording layer 34 side, the upper dielectric layer 35c is provided on the intermediate layer S2 side, and the intermediate dielectric layer 35b is provided between the lower dielectric layer 35a and the upper dielectric layer 35c.

The first dielectric layer 31 is a layer that protects the semi-transmissive reflective layer 32. The same materials as those of the lower dielectric layer 22a described above can be exemplified as a dielectric material constituting the first dielectric layer 31.

The semi-transmissive reflective layer 32 is configured to permit transmission of a laser beam used for recording or reproducing information signals. Specifically, the semi-transmissive reflective layer 32 has such a degree of transmittance that information signals can be recorded on the recording layer L0 provided behind the recording layer L1 containing the semi-transmissive reflective layer 32 as viewed from the beam irradiation surface C or information signals can be reproduced from the recording layer L0.

The phase-change recording layer 34 is the same as the phase-change recording layer 23 described above. However, the thickness, composition, etc. different from those of the phase-change recording layer 23 described above may be selected for the phase-change recording layer 34 according to desired characteristics.

When the phase-change recording layer 34 contains bismuth, germanium, tellurium, and silver, a content of silver relative to a total amount of bismuth, germanium, tellurium, and silver is preferably within a range of 2.0 at % or more and 3.5 at % or less. With a content of silver of 2.0 at % or more, good storage reliability can be achieved. On the other hand, with a content of silver of 3.5 at % or less, good recording characteristics can be obtained.

The lower dielectric layer 33a, the upper dielectric layer 33b, the lower dielectric layer 35a, the intermediate dielectric layer 35b, and the upper dielectric layer 35c are layers that protect the phase-change recording layer 34 and control optical characteristics and thermal stability.

The lower dielectric layer 33a contains a composite oxide composed of silicon oxide, indium oxide, and zirconium oxide, a composite oxide composed of indium oxide and gallium oxide, or a composite oxide composed of zinc oxide and aluminum oxide. Therefore, the occurrence of a defect can be suppressed.

When a composite oxide composed of silicon oxide, indium oxide, and zirconium oxide is used as a material of the lower dielectric layer 33a, a content of indium relative to a total amount of silicon, indium, and zirconium is preferably within a range of 66.7 at % (atomic %) or more and 94.7 at % or less, and, for example, about 82 at % is selected. With a content of indium within this range, good recording characteristics can be obtained.

The thickness of the lower dielectric layer 33a is preferably within a range of 3 nm or more and 20 nm or less. With the lower dielectric layer 33a having a thickness of 3 nm or more, good recording characteristics can be obtained. On the other hand, with the lower dielectric layer 33a having a thickness of 20 nm or less, a decrease in productivity (tact) and an increase in material cost can be suppressed.

The upper dielectric layer 33b contains tantalum oxide or a composite oxide composed of silicon oxide, indium oxide, and zirconium oxide. Since such a dielectric material is contained, good crystallization promoting performance can be achieved. In view of improvement in transmittance, tantalum oxide among these dielectric materials is preferably contained.

The same materials as those of the lower dielectric layer 22a described above can be exemplified as a dielectric material constituting the lower dielectric layer 35a, the intermediate dielectric layer 35b, and the upper dielectric layer 35c.

A composite oxide composed of silicon oxide, chromium oxide, and zirconium oxide is preferably used as a material of the lower dielectric layer 35a. This is because good recording characteristics can be obtained.

(Recording Layer L2)

Figure 2C:
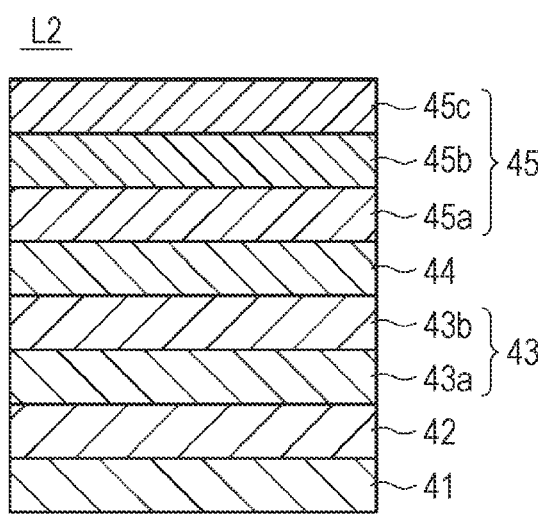
FIG. 2C is a schematic view showing an example of a configuration of a recording layer L2 shown in FIG. 1B.

As shown in FIG. 2C, the recording layer L2 is an example of transmissive recording layers, and includes, for example, a stacked film formed by stacking a first dielectric layer 41, a semi-transmissive reflective layer 42, a second dielectric layer 43, a phase-change recording layer 44, and a third dielectric layer 45 in that order on the intermediate layer S2.

The second dielectric layer 43 has a two-layer structure in which a lower dielectric layer 43a and an upper dielectric layer 43b are stacked. The lower dielectric layer 43a is provided on the semi-transmissive reflective layer 42 side, and the upper dielectric layer 43b is provided on the phase-change recording layer 44 side.

The third dielectric layer 45 has a three-layer structure in which for example, a lower dielectric layer 45a, an intermediate dielectric layer 45b, and an upper dielectric layer 45c are stacked. The lower dielectric layer 45a is provided on the phase-change recording layer 44 side, the upper dielectric layer 45c is provided on the light-transmissive layer 12 side, and the intermediate dielectric layer 45b is provided between the lower dielectric layer 45a and the upper dielectric layer 45c.

The first dielectric layer 41 is a layer that protects the semi-transmissive reflective layer 42. The same materials as those of the lower dielectric layer 22a described above can be exemplified as a dielectric material constituting the first dielectric layer 41.

The semi-transmissive reflective layer 42 is configured to permit transmission of a laser beam used for recording or reproducing information signals. Specifically, the semi-transmissive reflective layer 42 has such a degree of transmittance that information signals can be recorded on the recording layers L0 and L1 or information signals can be reproduced from the recording layers L0 and L1, the recording layers L0 and L1 being provided behind the recording layer L2 containing the semi-transmissive reflective layer 42 as viewed from the beam irradiation surface C.

The phase-change recording layer 44 is the same as the phase-change recording layer 34 described above. However, the thickness, composition, etc. different from those of the phase-change recording layer 34 described above may be selected for the phase-change recording layer 44 according to desired characteristics.

The lower dielectric layer 43a, the upper dielectric layer 43b, the lower dielectric layer 45a, the intermediate dielectric layer 45b, and the upper dielectric layer 45c are layers that protect the phase-change recording layer 44 and control optical characteristics and thermal stability.

The lower dielectric layer 43a contains a composite oxide composed of silicon oxide, indium oxide, and zirconium oxide, a composite oxide composed of indium oxide and gallium oxide, or a composite oxide composed of zinc oxide and aluminum oxide. Therefore, the occurrence of a defect can be suppressed.

When a composite oxide composed of silicon oxide, indium oxide, and zirconium oxide is used as a material of the lower dielectric layer 43a, a content of indium relative to a total amount of silicon, indium, and zirconium is preferably within a range of 66.7 at % or more and 94.7 at % or less, and, for example, about 82 at % is selected. With a content of indium within this range, good recording characteristics can be obtained.

The thickness of the lower dielectric layer 43a is preferably within a range of 3 nm or more and 20 nm or less. With the lower dielectric layer 43a having a thickness of 3 nm or more, good recording characteristics can be obtained. On the other hand, with the lower dielectric layer 43a having a thickness of 20 nm or less, a decrease in productivity (tact) and an increase in material cost can be suppressed.

The upper dielectric layer 43b contains tantalum oxide or a composite oxide composed of silicon oxide, indium oxide, and zirconium oxide. Since such a dielectric material is contained, good crystallization promoting performance can be achieved. In view of improvement in transmittance, tantalum oxide among these dielectric materials is preferably contained.

The same materials as those of the lower dielectric layer 22a described above can be exemplified as dielectric materials constituting the lower dielectric layer 45a, the intermediate dielectric layer 45b, and the upper dielectric layer 45c.

A composite oxide composed of silicon oxide, chromium oxide, and zirconium oxide is preferably used as a material of the lower dielectric layer 45a. This is because good recording characteristics can be obtained.

(Intermediate Layers S1 and S2)

The intermediate layers S1 and S2 have the function to space the recording layers L0 to L2 at a sufficient physical and optical distance therebetween, and each have a concave-convex surface. The concave-convex surface includes concentric or spiral grooves (in-grooves Gin and on-grooves Gon) formed therein. The thickness of each of the intermediate layers S1 and S2 is preferably set to 9 μm to 50 μm. The material of the intermediate layers S1 and S2 is not particularly limited, but an ultraviolet-curable acrylic resin is preferably used. Also, the intermediate layers S1 and S2 preferably have sufficiently high light transmissivity because the intermediate layers S1 and S2 serve as an optical path of a laser beam for recording or reproducing information signals on or from the innermost layer.

(Light-Transmissive Layer 12)

The light-transmissive layer 12 is a resin layer formed by, for example, curing a photosensitive resin such as an ultraviolet curable resin or the like. An example of a material of the resin layer is a ultraviolet-curable acrylic resin. Also, the light-transmissive layer 12 may include a light-transmissive sheet having a ring shape and an adhesive layer used for bonding the light-transmissive sheet to the substrate 11. The light-transmissive sheet is preferably composed of a material having low absorptivity for a laser beam used for recording and reproduction, specifically, a material having a transmittance of 90% or more. Examples of the material of the light-transmissive sheet include polycarbonate resin materials, polyolefin resins (for example, Zeonex (registered trade name)), and the like. Examples of a material of the adhesive layer include ultraviolet curable resins, pressure-sensitive adhesives (PSA), and the like.

The thickness of the light-transmissive layer 12 is preferably selected within a range of 10 μm or more and 177 μm or less, for example, 100 μm. High-density recording can be realized by combining the light-transmissive thin layer 12 with an objective lens having a higher NA (numerical aperture) of, for example, about 0.85.

(Hard Coat Layer)

Although not shown in the drawings, a hard coat layer may be further provided on the surface (laser irradiation surface) of the light-transmissive layer 12 in order to protect against mechanical impact and damage and protect recording/reproduction quality of information signals from adhesion of dust and fingerprints of the user during handling. An ultraviolet-curable resin mixed with a silica gel fine powder for improving mechanical strength, a solvent type, or a solvent-less type can be used for the hard coat layer. In order to impart mechanical strength and water-repellency and oil-repellency, the thickness is preferably about 1 μm to several μm.

3. Method for Manufacturing Light Recording Medium

Next, an example of a method for manufacturing an optical recording medium according to an embodiment of the present disclosure is described.

(Step of Forming Substrate 11)

First, the substrate 11 having a concave-convex surface formed on a main surface thereof is formed. For example, an injection molding method, a photo-polymerization method (2P method), or the like can be used as the method for forming the substrate 11.

(Step of Forming Recording Layer L0)

Next, the reflective layer 21, the lower dielectric layer 22a, the upper dielectric layer 22b, the phase-change recording layer 23, the lower dielectric layer 24a, and the upper dielectric layer 24b are stacked in that order on the substrate 11 by, for example, a sputtering method. As a result, the recording layer L0 is formed on the substrate 11.

(Step of Forming Intermediate Layer S1)

Next, an ultraviolet curable resin is uniformly applied to the recording layer L0 by, for example, a spin coating method. Then, a concave-convex pattern of a stamper is pressed on the uniformly applied ultraviolet curable resin, the resin is cured by ultraviolet irradiation, and then the stamper is removed. As a result, the concave-convex pattern of the stamper is transferred to the ultraviolet curable resin, forming the intermediate layer S1 provided with, for example, in-grooves Gin and on-grooves Gon, on the recording layer L0.

(Step of Forming Recording Layer L1)

Next, the first dielectric layer 31, the semi-transmissive reflective layer 32, the lower dielectric layer 33a, the upper dielectric layer 33b, the phase-change recording layer 34, the lower dielectric layer 35a, the intermediate dielectric layer 35b, and the upper dielectric layer 35c are stacked in that order on the intermediate layer S1 by, for example, a sputtering method. As a result, the recording layer L1 is formed on the intermediate layer S1.

The lower dielectric layer 33a and the upper dielectric layer 33b are preferably deposited as follows. First, a target is sputtered while rare gas such as Ar gas is introduced as process gas, thereby depositing the lower dielectric layer 33a on the semi-transmissive reflective layer 32. Next, a target is sputtered while rare gas such as Ar gas and oxygen gas are introduced as process gas, thereby depositing the upper dielectric layer 33b on the lower dielectric layer 33a. This deposition can achieve good recording characteristics over the entire surface of the recording layer L1.

(Step of Forming Intermediate Layer S2)

Next, an ultraviolet curable resin is uniformly applied to the recording layer L1 by, for example, a spin coating method. Then, a concave-convex pattern of a stamper is pressed on the uniformly applied ultraviolet curable resin, the resin is cured by ultraviolet irradiation, and then the stamper is removed. As a result, the concave-convex pattern of the stamper is transferred to the ultraviolet curable resin, forming the intermediate layer S2 provided with, for example, in-grooves Gin and on-grooves Gon on the recording layer L1.

(Step of Forming Recording Layer L2)

Next, the first dielectric layer 41, the semi-transmissive reflective layer 42, the lower dielectric layer 43a, the upper dielectric layer 43b, the phase-change recording layer 44, the lower dielectric layer 45a, the intermediate dielectric layer 45b, and the upper dielectric layer 45c are stacked in that order on the intermediate layer S2 by, for example, a sputtering method. As a result, the recording layer L2 is formed on the intermediate layer S2.

The lower dielectric layer 43a and the upper dielectric layer 43b are preferably deposited by the same method as for the lower dielectric layer 33a and the upper dielectric layer 33b described above. This deposition can achieve good recording characteristics over the entire surface of the recording layer L2.

(Step of Forming Light-Transmissive Layer)

Next, a photosensitive resin such as an ultraviolet curable resin (UV resin) is spin-coated on the recording layer L2 by, for example, a spin coating method, and then the photosensitive resin is cured by irradiation of light such as ultraviolet light. As a result, the light-transmissive layer 12 is formed on the recording layer L2.

The intended optical recording medium 10 can be produced through the above-described steps.

EXAMPLES

Although the present disclosure is described in detail below with reference to examples, the present disclosure is not limited to these examples. In the examples below, portions corresponding to the above-described embodiments are denoted by the same reference numerals (refer to FIG. 1B and FIGS. 2A to 2C).

Notation in the examples is described below.

Subscripts x1, y1, z1 of $SiO_{2x1}$—$(In_2O_3)_{y1}$—$(ZrO_2)_{z1}$ each represent mol % (however, x1+y1+z1=100 [mol %]).

Subscripts x2, and y2 of $(ZnS)_{x2}$—$(SiO_2)_{y2}$ each represent mol % (however, x2+y2=100 [mol %]).

Subscripts x3, y3, and z3 of $Ge_{x3}$—$Sb_{y3}$—$Te_{z3}$ each represent at. % (however, x3+y3+z3=100 [at. %]).

Subscripts x4, y4, and z4 of $Bi_{x4}$—$Ge_{y4}$—$Te_{z4}$ each represent at. % (however, x4+y4+z4=100 [at. %]).

Subscripts x5, y5, z5, and w5 of $Bi_{x5}$—$Ge_{y5}$—$Te_{z5}$—$Ag_{w5}$ each represent at. % (however, x5+y5+z5+w5=100 [at. %]).

DOW(n) represents n times of direct over write on the optical recording medium 10.

The examples are described below in the following order.

I. Relation between material and DOW characteristics of second dielectric layer

II. Improvement in signal characteristics due to use of oxygen-containing process gas III. Dependence of recorded signal quality and storage reliability on amount of Ag added IV. Composition of lower dielectric layer of second dielectric layer V. Thickness of lower dielectric layer of second dielectric layer VI. Relation between composition and storage reliability of lower dielectric layer of second dielectric layer VII. Relation between composition and signal characteristics of upper dielectric layer of second dielectric layer

I. Relation Between Material and DOW Characteristics of Second Dielectric Layer Reference Examples 1-1 to 1-3

Step of Forming Substrate 11

First, a polycarbonate substrate 11 having a diameter of 120 mm, a thickness of 1.1 mm, and grooves with a track pitch of 0.32 μm was formed.

(Step of Forming Recording Layer L0)

Next, the reflective layer 21, the lower dielectric layer 22a, the upper dielectric layer 22b, the phase-change recording layer 23, the lower dielectric layer 24a, and the upper dielectric layer 24b, which had compositions and thicknesses below, were stacked in that order on the polycarbonate substrate 11 by, for example, a sputtering method. As a result, the recording layer L0 was formed on the substrate 11.

Upper dielectric layer 24b: SiN, 60 nm
Lower dielectric layer 24a: $(ZnS)_{80}$—$(SiO_2)_{20}$, 18 nm
Phase-change recording layer 23: $Ge_{5.5}$—$Sb_{74.4}$—$Te_{20.1}$, 9 nm
Upper dielectric layer 22b: $(ZnS)_{80}$—$(SiO_2)_{20}$, 11.5 nm
Lower dielectric layer 22a: SiN, 3 nm
Reflective layer 21: Ag alloy (AgPdCu), 80 nm (Step of Forming Intermediate Layer S1)

Next, an ultraviolet curable resin was uniformly applied to the recording layer L0 by, for example, a spin coating method. Then, a concave-convex pattern of a stamper was pressed on the uniformly applied ultraviolet curable resin, the resin was cured by ultraviolet irradiation, and then the stamper was removed. As a result, the intermediate layer S1 having a thickness of 25 μm and grooves with a track pitch of 0.32 μm was formed.

(Step of Forming Recording Layer L1)

Next, the dielectric layer 31, the semi-transmissive reflective layer 32, the dielectric layer 33, the phase-change recording layer 34, the lower dielectric layer 35a, the intermediate dielectric layer 35b, and the upper dielectric layer 35c, which had compositions and thicknesses below, were stacked in that order on the intermediate layer S1 by, for example, a sputtering method. As a result, the recording layer L1 was formed on the intermediate layer S1.

Upper dielectric layer 35c: SiN, 30 nm
Intermediate dielectric layer 35b: $(ZnS)_{80}$—$(SiO_2)_{20}$, 20 nm
Lower dielectric layer 35a: $(SiO_2)_{20}$—$(Cr_2O_3)_{30}$—$(ZrO_2)_{50}$, 2 nm
Phase-change recording layer 34: $Bi_{5.0}$—$Ge_{42.5}$—$Te_{50.0}$, 6.5 nm
Dielectric layer 33: a dielectric layer having a single-layer structure with a composition changed for each sample as shown in Table 1, 6 nm
Semi-transmissive reflective layer 32: Ag alloy (AgPdCu), 9.5 nm
Dielectric layer 31: $TiO_2$, 11 nm Table 1 shows the compositions and thicknesses of the dielectric layers 33 of the recording layers L1 of the optical recording media 10 of Reference Examples 1-1 to 1-3.

TABLE 1

| | Second dielectric layer (single phase) | |
|---|---|---|
| | Composition | Thickness [nm] |
| Reference Example 1-1 | $Ta_2O_5$ | 6 |
| Reference Example 1-2 | $(SiO_2)_{15}$—$(In_2O_3)_{50}$—$(ZrO_2)_{35}$ | 6 |
| Reference Example 1-3 | $(SiO_2)_{35}$—$(In_2O_3)_{30}$—$(ZrO_2)_{35}$ | 6 |

(Step of Forming Intermediate Layer S2)

Next, an ultraviolet curable resin was uniformly applied to the recording layer L1 by, for example, a spin coating method. Then, a concave-convex pattern of a stamper was pressed on the uniformly applied ultraviolet curable resin, the resin was cured by ultraviolet irradiation, and then the stamper was removed. As a result, the intermediate layer S2 having a thickness of 18 μm and grooves with a track pitch of 0.32 μm was formed.

(Step of Forming Recording Layer L2)

Next, the dielectric layer 41, the semi-transmissive reflective layer 42, the lower dielectric layer 43a, the upper dielectric layer 43b, the phase-change recording layer 44, the lower dielectric layer 45a, the intermediate dielectric layer 45b, and the upper dielectric layer 45c, which had compositions and thicknesses below, were stacked in that order on the intermediate layer S2 by, for example, a sputtering method. As a result, the recording layer L2 was formed on the intermediate layer S2.

Upper dielectric layer 45c: SiN, 18 nm

Intermediate dielectric layer 45b: $(ZnS)_{80}$—$(SiO_2)_{20}$, 22 nm

Lower dielectric layer 45a: $(SiO_2)_{20}$—$(Cr_2O_3)_{30}$—$(ZrO_2)_{50}$, 2 nm Phase-change recording layer 44: $Bi_{5.05}$—$Ge_{42.94}$—$Te_{50.51}$—$Ag_{1.5}$, 6.5 nm Upper dielectric layer 43b: $(SiO_2)_{35}$—$(In_2O_3)_{30}$—$(ZrO_2)_{35}$, 2 nm Lower dielectric layer 43a: $(SiO_2)_{15}$—$(In_2O_3)_{70}$—$(ZrO_2)_{15}$, 4 nm Semi-transmissive reflective layer 42: Ag alloy (AgPdCu), 9.5 nm Dielectric layer 41: $TiO_2$, 12 nm (Step of Forming Light-Transmissive Layer 12)

Next, an ultraviolet curable resin was uniformly applied to the recording layer L2 by, for example, a spin coating method, and then cured by irradiation of light such as ultraviolet light, thereby forming the light-transmissive layer 12 having a thickness of 57 μm.

Therefore, the intended three-layer optical recording medium 10 was produced.

[Evaluation]

The DOW characteristics of the recording layers L1 of the optical recording media 10 of Reference Examples 1-1 to 1-3 produced as described above were evaluated as follows.

(DOW Characteristics)

Using a disc tester (manufactured by Pulstec Industrial Co., Ltd., trade name ODU-1000), 1-7 modulation data with a density of 33 GB per layer was repeatedly recorded and reproduced at a numeral aperture NA=0.85, a recording wavelength λ=405 nm, and a recording velocity v=7.69 m/s, and i-MLSE was determined at each time of recording and reproduction. The results are shown in FIG. 3.

Figure 3:
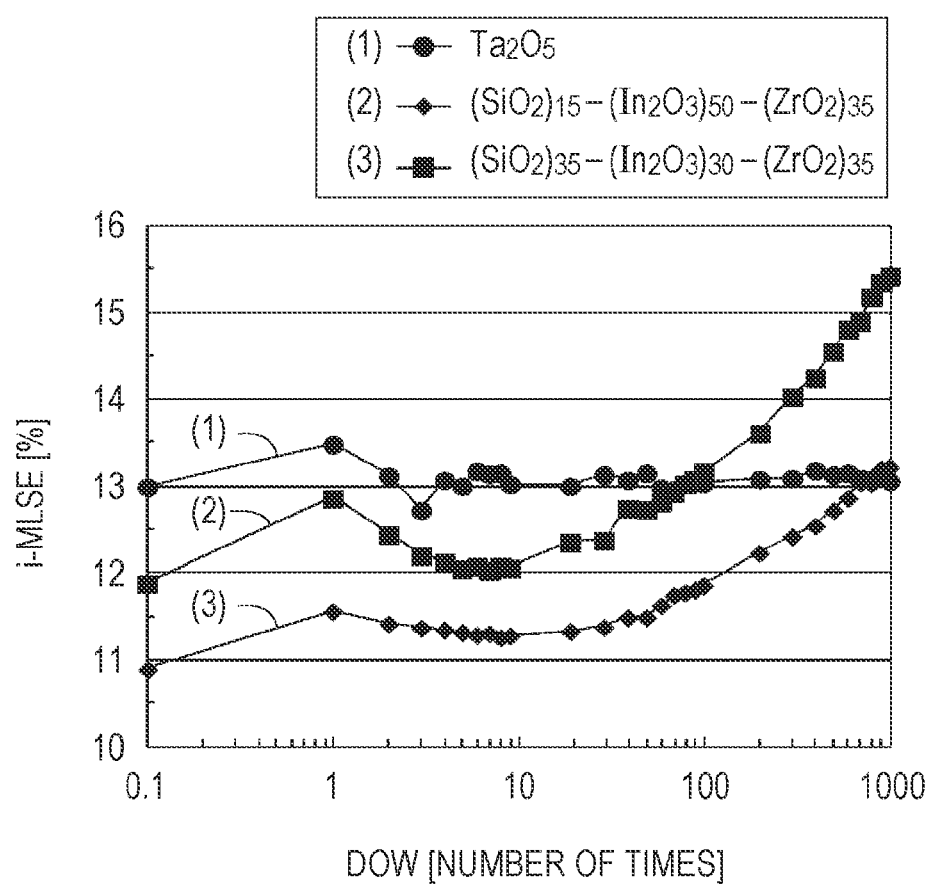
FIG. 3 is a graph showing evaluation results of DOW (Direct Over Write) characteristics of recording layers of optical recording media of Reference Examples 1-1 to 1-3.

FIG. 3 reveals the following.

When $Ta_2O_3$ is used as a material of the dielectric layer 33, i-MLSE is substantially constant independently of increases in the number of times of recording. On the other hand, when $(SiO_2)$—$(In_2O_3)$—$(ZrO_2)$ is used as a material of the dielectric layer 33, i-MLSE shows the tendency to increase with increases in the number of times of recording.

When $(SiO_2)$—$(In_2O_3)$—$(ZrO_2)$ is used as a material of the dielectric layer 33, the DOW characteristics tend to be improved by increasing the content of $In_2O_3$.

II. Improvement in Signal Characteristics Due to Use of Oxygen-Containing Process Gas Reference Examples 2-1 to 2-3

In the step of forming the dielectric layer 33 of the recording layer L1, the contents of argon and oxygen in the process gas were changed for each sample as shown in Table 2. Also, in the step of forming the phase-change recording layer 34 of the recording layer L1, the phase-change recording layer 34 was formed using BiGeTe—Ag. The content of Ag as an additive was 2.0 at %. Further, formation of the intermediate layer S2 and the recording layer L2 was omitted. A two-layer optical recording medium 10 was produced by the same method as in Reference Example 1-1 with the exception of the above.

Table 2 shows the configurations and deposition conditions of the dielectric layers 33 of the recording layers L1 of the optical recording media 10 of Reference Examples 2-1 to 2-3. In Table 2, the content (%) of each of argon and oxygen is a flow rate ratio.

TABLE 2

| | Second dielectric layer (single phase) | | | |
|---|---|---|---|---|
| | | | Deposition condition | |
| | | | Argon | Oxygen |
| | | Thickness | content | content |
| | Composition | [nm] | [%] | [%] |
| Reference Example 2-1 | $Ta_2O_5$ | 6 | 100.0 | 0.0 |
| Reference Example 2-2 | $Ta_2O_5$ | 6 | 98.5 | 1.5 |
| Reference Example 2-3 | $Ta_2O_5$ | 6 | 97.0 | 3.0 |

Reference Examples 2-4 to 2-7

In the step of forming the dielectric layer 33 of the recording layer L1, the contents of argon and oxygen in the process gas were changed for each sample as shown in Table 3. Also, in the step of forming the phase-change recording layer 34 of the recording layer L1, the phase-change recording layer 34 was formed using BiGeTe—Ag. The content of Ag as an additive was 3.0 at %. A three-layer optical recording medium 10 was produced by the same method as in Reference Example 1-1 with the exception of the above.

In Reference Examples 2-1 to 2-7, the content (at %) of Ag represents a content of Ag relative to a total amount of Bi, Ge, Te, and Ag contained in the phase-change recording layer 34. A BiGeTe alloy used as a base agent of the phase-change recording layer 34 was a material composition containing a GeTe compound and a $Bi_2Te_3$ compound at a molar ratio of 17:1 (=$GeTe:Bi_2Te_3$).

Table 3 shows the configurations and deposition conditions of the dielectric layers 33 of the recording layers L1 of the optical recording media 10 of Reference Examples 2-4 to 2-7. In Table 2, the content (%) of each of argon and oxygen is a flow rate ratio.

TABLE 3

| | Second dielectric layer (single phase) | | | |
|---|---|---|---|---|
| | | Thickness | Argon content | Oxygen content |
| | Composition | [nm] | [%] | [%] |
| Reference Example 3-1 | $Ta_2O_5$ | 6 | 100.0 | 0.0 |
| Reference Example 3-2 | $Ta_2O_5$ | 6 | 98.5 | 1.5 |
| Reference Example 3-3 | $Ta_2O_5$ | 6 | 97.0 | 3.0 |
| Reference Example 3-4 | $Ta_2O_5$ | 6 | 94.0 | 6.0 |

[Evaluation]

The DOW characteristics and recording power Pw dependence of i-MLSE and degree of modulation (signal amplitude ratio) of the optical recording media 10 of Reference Examples 2-1 to 2-7 produced as described above were evaluated as follows.

(DOW Characteristics)

The DOW characteristics of the recording layer L2 of each of the optical recording media 10 were evaluated by the same method as in Reference Examples 1-1 to 1-3. The results are shown in FIGS. 4A and 5.

(Dependence of i-MLSE and Degree of Modulation on Recording Power Pw)

Using a disc tester (manufactured by Pulstec Industrial Co., Ltd., trade name ODU-1000), 1-7 modulation data with a density of 33 GB per layer was recorded and reproduced at a numeral aperture NA=0.85, a recording wavelength λ=405 nm, and a recording linear velocity v=7.69 m/s to determine changes in i-MLSE and the degree of modulation versus recording power Pw. The results are shown in FIG. 4B.

Figure 4A:
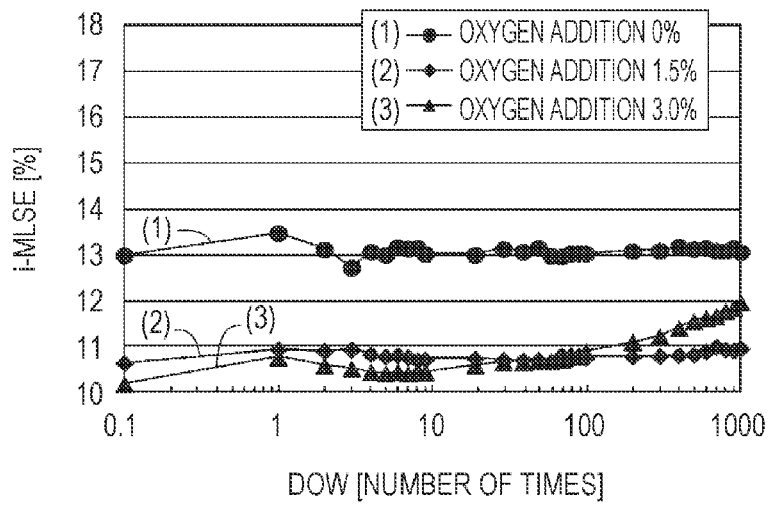
FIG. 4A is a graph showing evaluation results of DOW characteristics of optical recording media of Reference Examples 2-1 to 2-3.
Figure 4B:
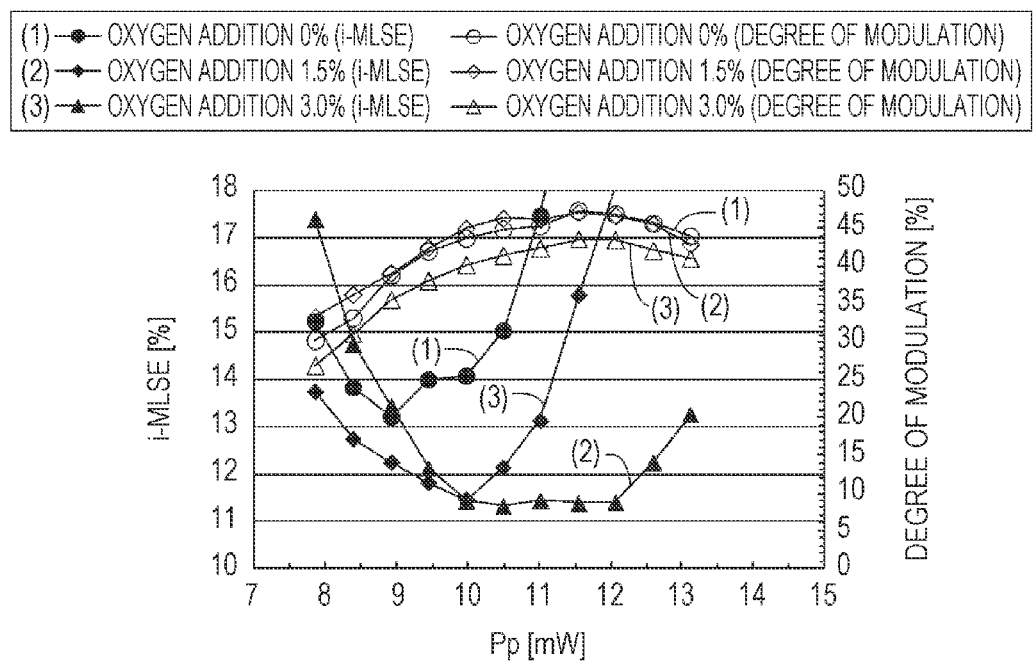
FIG. 4B is a graph showing recording power dependence of i-MLSE (integrated Maximum Likelihood Sequence Estimation) and degree of modulation of the optical recording media of Reference Examples 2-1 to 2-3.
Figure 5:
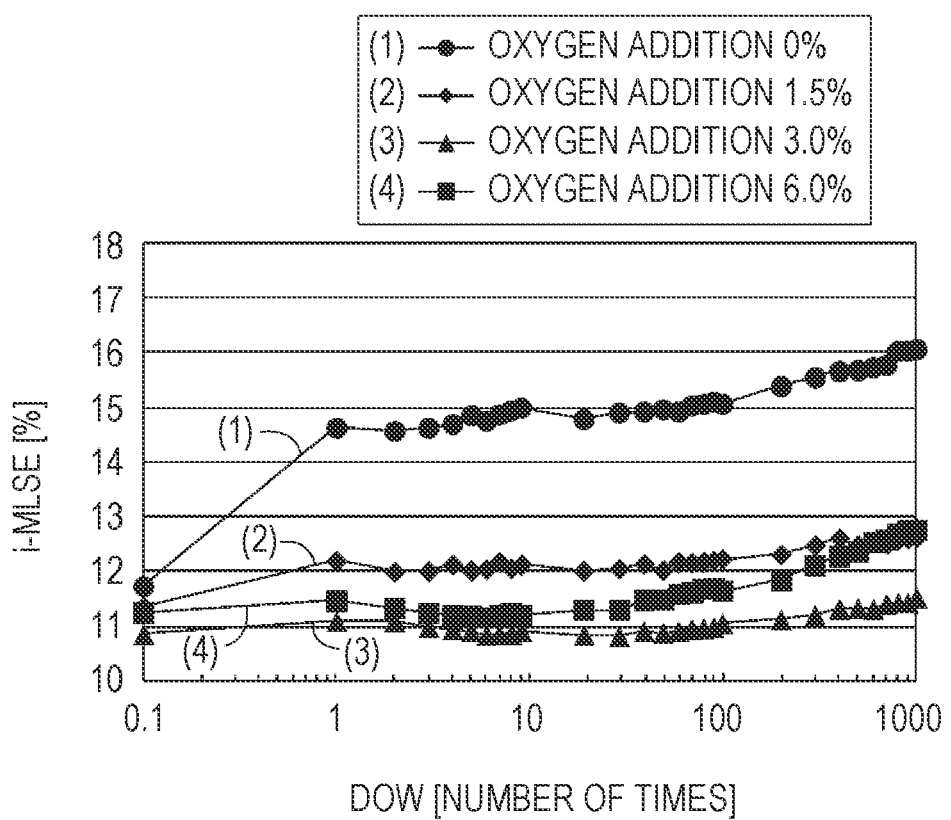
FIG. 5 is a graph showing evaluation results of DOW characteristics of optical recording media of Reference Examples 2-4 to 2-7.

FIGS. 4A and 4B reveal the following.

The recording characteristics (DOW characteristics and power margin) can be improved by adding oxygen to the process gas during deposition of the dielectric layer 33. The degree of improvement increases as the amount of oxygen added increases. This effect is possibly exhibited due to the fact that the crystallization promoting performance of the phase-change recording layer 34 is enhanced by adding oxygen to the process gas for depositing the dielectric layer 33.

FIG. 5 shows the same tendency as in FIG. 4A.

III. Dependence of Recorded Signal Quality and Storage Reliability on Amount of Ag Added

Examples 1-1 to 1-8

A three-layer optical recording medium 10 was produced by the same method as in Reference Example 1-1 except that a recording layer L1 including a stacked film having compositions and thicknesses below was formed on an intermediate layer S1 by a sputtering method.

Upper dielectric layer 35c: SiN, 30 nm
Intermediate dielectric layer 35b: $(ZnS)_{80}$—$(SiO_2)_{20}$, 20 nm
Lower dielectric layer 35a: $(SiO_2)_{20}$—$(Cr_2O_3)_{30}$—$(ZrO_2)_{50}$, 2 nm
Phase-change recording layer 34: BiGeTe—Ag, 6.5 nm
Upper dielectric layer 33b: $Ta_2O_5$, 2 nm
Lower dielectric layer 33a: $(SiO_2)_{15}$—$(In_2O_3)_{70}$—$(ZrO_2)_{15}$, 4 nm
Semi-transmissive reflective layer 32: Ag alloy (AgPdCu), 9.5 nm
Dielectric layer 31: $TiO_2$, 11 nm In the phase-change recording layer 34, the content of Ag as an additive was changed within a range of 0 to 4.0 at % as shown in Table 4. The content (at %) of Ag represents a content of Ag relative to a total amount of Bi, Ge, Te, and Ag contained in the phase-change recording layer 34. A BiGeTe alloy used as a base agent of the phase-change recording layer 34 was a material composition containing a GeTe compound and a $Bi_2Te_3$ compound at a molar ratio of 17:1 (=GeTe:$Bi_2Te_3$).

[Evaluation]

The recorded signal quality (initial characteristic) and storage reliability of the recording layers L2 of the optical recording media 10 of Examples 1-1 to 1-8 produced as described above were evaluated as described below.

(Recorded Signal Quality)

The i-MLSE and degree of modulation of the optical recording media 10 of Examples 1-1 to 1-8 produced as described above were determined as described below to evaluate recorded signal quality as an initial characteristic. Using a disc tester (manufactured by Pulstec Industrial Co., Ltd., trade name ODU-1000), 1-7 modulation data with a density of 33 GB per layer was recorded and reproduced at a numeral aperture NA=0.85, a recording wavelength λ=405 nm, and a recording linear velocity v=7.69 m/s to determine changes in i-MLSE and the degree of modulation versus recording power Pw. The results are shown in FIGS. 6A to 9B. In FIGS. 6A to 9B, a value (Pw/Pwo) obtained by normalizing recording power Pw with optimum recording power Pwo is shown on the abscissa. The optimum recording power Pwo is recording powder with which i-MLSE is at the bottom, that is, recording power with which i-MLSE becomes best. Table 4 shows the bottom value of i-MLSE.

(Storage Reliability)

The storage reliability of the optical recording media 10 of Examples 1-1 to 1-8 used for evaluating the initial characteristic described above was determined as described below. First, an information signal was recorded and reproduced on the optical recording medium 10 with the optimum recording powder Pwo to measure i-MLSE. Next, the optical recording medium 10 on which the information signal had been recorded was placed in a greenhouse environment of 80° C. and 85% for 15 hours. Next, the optical recording medium 10 was removed from the greenhouse environment, and then i-MLSE of the recorded information signal was again measured to determine a change of i-MLSE (referred to as "ΔiMLSE (storage)" hereinafter) before and after storage according to an equation below. The results are shown in Table 4.

ΔiMLSE (storage)=[i-MLSE after storage test with normalized value (Pw/Pwo)=1]−[i-MLSE before storage test with normalized value (Pw/Pwo)=1]

Table 4 shows the configurations and evaluation results of the lower dielectric layers 33a, the upper dielectric layers 33b, and the phase-change recording layers 34 of the optical recoding media 10 of Examples 1-1 to 1-8.

TABLE 4

| | Second dielectric layer | | | | Phase-change recording layer | | | Evaluation results | |
| --- | --- | --- | --- | --- | --- | --- | --- | --- | --- |
| | Lower | | Upper | | | | | | |
| | Composition | Thickness [nm] | Composition | Thickness [nm] | Composition | Ag content [at %] | Thickness [nm] | ΔiMLSE [%] | i-MLSE bottom [%] |
| Example 1-1 | $(SiO_2)_{15}$—$(In_2O_3)_{70}$—$(ZrO_2)_{15}$ | 4 | $Ta_2O_5$ | 2 | BiGeTe—Ag | 0.0 | 6.5 | 4.0 | 12.2 |
| Example 1-2 | | | | | | 1.0 | | 2.6 | 11.9 |
| Example 1-3 | | | | | | 1.5 | | 2.6 | 10.7 |
| Example 1-4 | | | | | | 2.0 | | 0.6 | 11.8 |
| Example 1-5 | | | | | | 2.5 | | 0.3 | 10.7 |

TABLE 4-continued

| | Second dielectric layer | | | | Phase-change recording layer | | | Evaluation results | |
| --- | --- | --- | --- | --- | --- | --- | --- | --- | --- |
| | Composition | Thickness [nm] | Composition | Thickness [nm] | Composition | Ag content [at %] | Thickness [nm] | ΔiMLSE [%] | i-MLSE bottom [%] |
| Example 1-6 | | | | | | 3.0 | | 0.6 | 11.9 |
| Example 1-7 | | | | | | 3.5 | | 0.0 | 11.9 |
| Example 1-8 | | | | | | 4.0 | | 0.0 | 15.9 |

Table 4 reveals the following.

With an amount of Ag added of 2.0 at % or more, ΔiMLSE (storage) can be decreased to 1.0% or less. The ΔiMLSE (storage) exceeding 1.0% causes a significant loss of the information signal during long-term storage.

With an amount of Ag added of 3.5 at % or less, the bottom value of iMLSE can be decreased to 13.5% or less. With a bottom value of iMLSE exceeding 13.5%, a good recorded signal is nor be obtained.

Therefore, the amount of Ag added is preferably within a range of 2.0 at % or more and 3.5 at % or less.

IV. Composition of Lower Dielectric Layer of Second Dielectric Layer

Examples 2-1 to 2-6

A three-layer optical recording medium 10 was produced by the same method as in Reference Example 1-1 except that a recording layer L1 including a stacked film having compositions and thicknesses below was formed on an intermediate layer S1 by a sputtering method.

Upper dielectric layer 35c: SiN, 30 nm

Intermediate dielectric layer 35b: $(ZnS)_{80}$—$(SiO_2)_{20}$, 20 nm

Lower dielectric layer 35a: $(SiO_2)_{20}$—$(Cr_2O_3)_{30}$—$(ZrO_2)_{50}$, 2 nm Phase-change recording layer 34: $Bi_{5.0}$—$Ge_{42.5}$—$Te_{50.0}$—$Ag_{2.5}$, 6.5 nm Upper dielectric layer 33b: $Ta_2O_5$, 2 nm Lower dielectric layer 33a: dielectric layer with a composition changed for each sample as shown in Table 5, 4 nm Semi-transmissive reflective layer 32: Ag alloy (AgPdCu), 9.5 nm Dielectric layer 31: $TiO_2$, 11 nm

[Evaluation]

The DOW characteristics of the optical recording media 10 of Examples 2-1 to 2-6 produced as described above were evaluated by the same method as in Reference Examples 1-1 to 1-3. The results are shown in FIGS. 6A to 7B and Table 5. Next, a change of i-MLSE (referred to as "ΔiMLSE(DOW)" hereinafter) wad determined according to an equation below. The results are shown in FIG. 6B and Table 5.

$$\Delta\text{iMLSE(DOW)} = [\text{i-MLSE of DOW(1000)}] - [\text{i-MLSE of DOW(0)}]$$

Herein, i-MLSE of DOW(1000) and i-MLSE of DOW(0) are values evaluated with the optimum recording power Pwo.

Table 5 shows the configurations and evaluation results of the second dielectric layers 33 of the recording layers L1 of the optical recoding media 10 of Examples 2-1 to 2-6.

TABLE 5

| | Second dielectric layer | | | | Evaluation results | |
| --- | --- | --- | --- | --- | --- | --- |
| | Lower | | | Upper | | |
| | Composition | In content | Thickness [nm] | Composition | Thickness [nm] | i-MLSE of DOW(1000) [%] | ΔiMLSE [%] |
| Example 2-1 | $(SiO_2)_{35}$—$(In_2O_3)_{30}$—$(ZrO_2)_{35}$ | 46.2 | 4 | $Ta_2O_5$ | 2 | 12.6 | 2.6 |
| Example 2-2 | $(SiO_2)_{15}$—$(In_2O_3)_{50}$—$(ZrO_2)_{35}$ | 66.7 | 4 | | | 11.96 | 1.6 |
| Example 2-3 | $(SiO_2)_{15}$—$(In_2O_3)_{70}$—$(ZrO_2)_{15}$ | 82.4 | 4 | | | 10.94 | 1.2 |
| Example 2-4 | $(SiO_2)_{5}$—$(In_2O_3)_{90}$—$(ZrO_2)_{5}$ | 94.7 | 4 | | | 10.52 | 1.8 |
| Example 2-5 | $(In_2O_3)_{80}$—$(Ga_2O_3)_{20}$ | 80 | 4 | | | 10.56 | 0.9 |
| Example 2-6 | $(ZnO_2)_{97}$—$(Al_2O_3)_3$ | 0 | 4 | | | 10.88 | 0.8 |

Figure 6A:
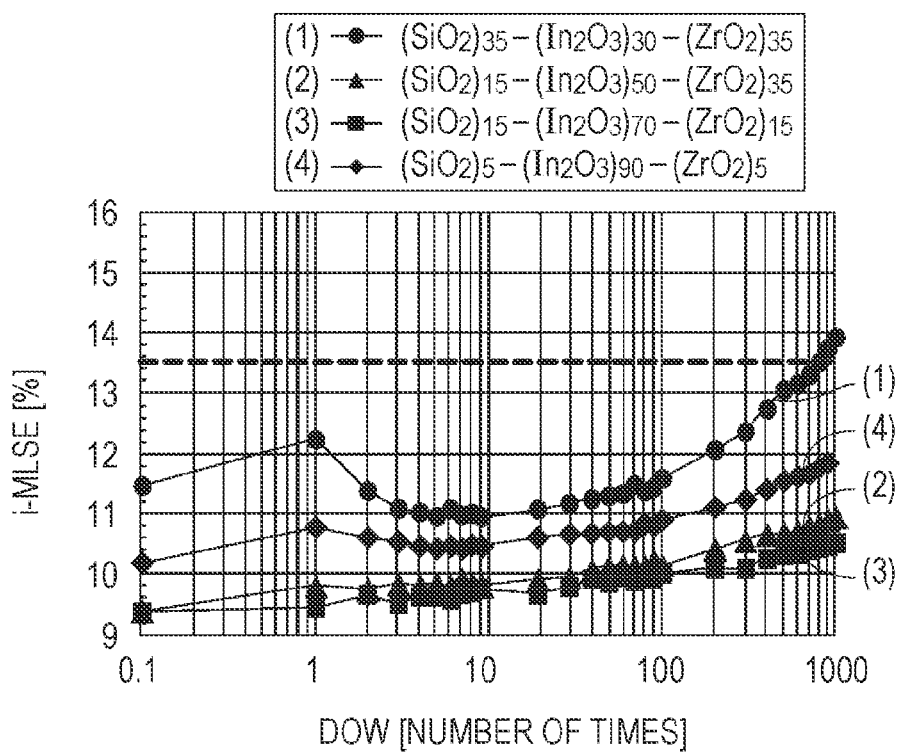
FIG. 6A is a graph showing evaluation results of DOW characteristics of optical recording media of Examples 2-1 to 2-4.
Figure 6B:
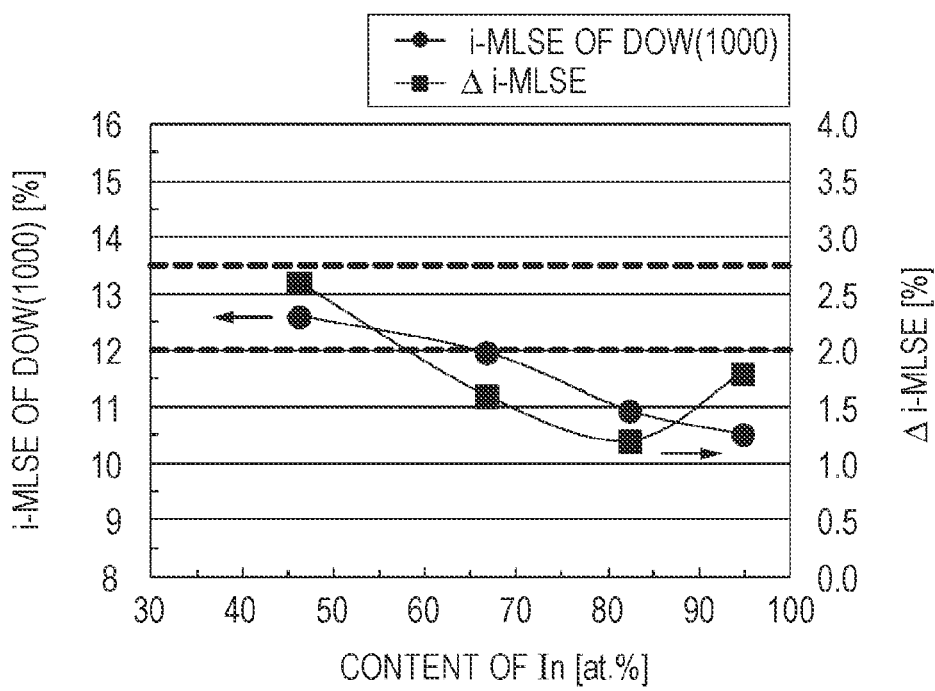
FIG. 6B is a graph showing evaluation results of i-MLSE and ΔiMLSE of DOW(1000) of Examples 2-1 to 2-4.

FIGS. 6A and 6B and Table 5 reveal the following.

When $SiO_2$—$In_2O_3$—$ZrO_2$ is used as a material of the lower dielectric layer 33a, the DOW characteristics tend to be improved by increasing the In content. This is considered to be due to an increase in thermal conductivity of the lower dielectric layer 33a due to an increase in the In content.

With an In content within a range of 66.7 at % or more and 94.7 at % or less, i-MLSE can be decreased to 13.5% or less as a reference value. With i-MLSE of 13.5% or less as the reference value, good reproduction characteristics can be obtained even with variations in a reproduction system of a consumer-oriented drive. The range of In content (at %) is converted to a range of $In_2O_3$ content (mol %) of 50 mol % or more and 90 mol % or less. The content of In represents a content of In relative to a total amount of the three components of Si, In, and Zr. The content of $In_2O_3$ represents a content of $In_2O_3$ relative to a total amount of the three components of $SiO_2$, $In_2O_3$, and $ZrO_2$.

With an In content of 33.3 at % or more, a change Δi-MLSE (DOW) can be decreased to 2% or less as a reference value. With a change Δi-MLSE(DOW) of 2% or less as the reference value, stable repeated recoding can be realized even with variations in a recording system of a consumer-oriented drive.

Figure 7A:
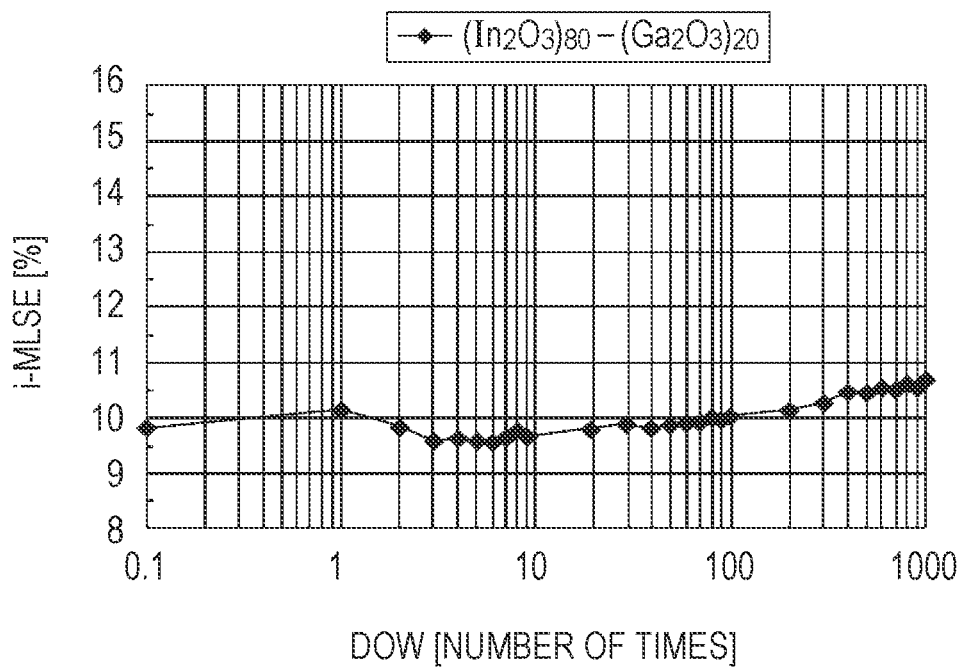
FIG. 7A is a graph showing evaluation results of DOW characteristics of an optical recording medium of Example 2-5.
Figure 7B:
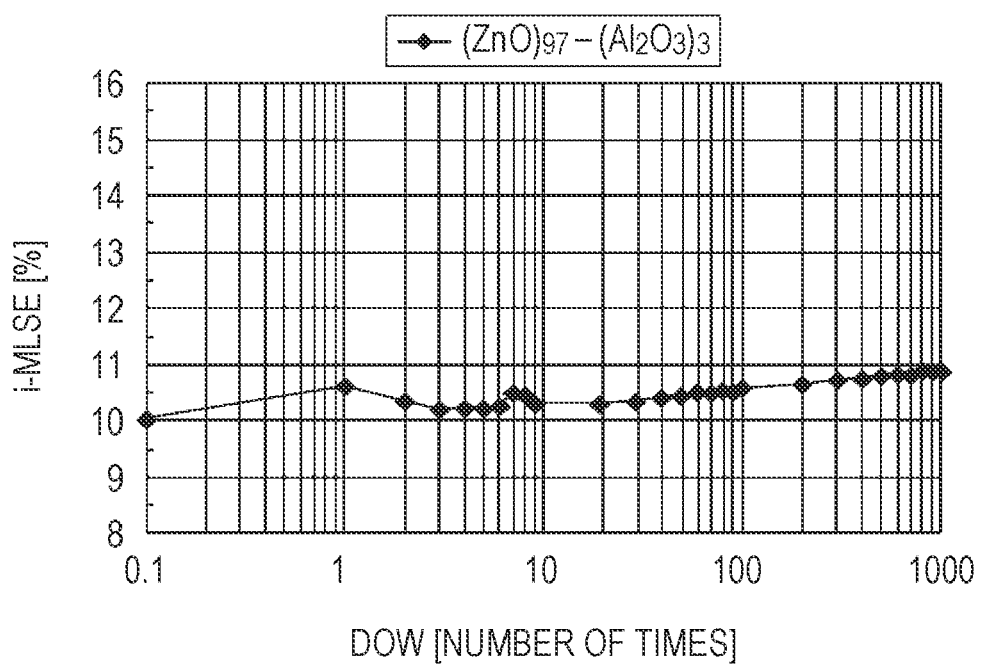
FIG. 7B is a graph showing evaluation results of DOW characteristics of an optical recording medium of Example 2-6.

FIGS. 7A and 7B and Table 5 reveal the following.

Even when other than $SiO_2$—$In_2O_3$—$ZrO_2$, $In_2O_3$—$Ga_2O_3$ containing indium oxide or ZnO—$Al_2O_3$ which is a conductive material and considered to have high thermal conductivity is used as a material of the lower dielectric layer 33a of the second dielectric layer 33, good DOW characteristics can be obtained.

V. Thickness of Lower Dielectric Layer of Second Dielectric Layer

Examples 3-1 to 3-5

A three-layer optical recording medium 10 was produced by the same method as in Reference Example 1-1 except that a recording layer L1 including a stacked film having compositions and thicknesses below was formed on an intermediate layer S1 by a sputtering method.

Upper dielectric layer 35c: SiN, 30 nm
Intermediate dielectric layer 35b: $(ZnS)_{80}$—$(SiO_2)_{20}$, 20 nm
Lower dielectric layer 35a: $(SiO_2)_{20}$—$(Cr_2O_3)_{30}$—$(ZrO_2)_{50}$, 2 nm
Phase-change recording layer 34: $Bi_{5.0}Ge_{42.5}Te_{50.0}$—$Ag_{2.5}$, 6.5 nm
Upper dielectric layer 33b: $Ta_2O_5$, 2 nm
Lower dielectric layer 33a: $(SiO_2)_{15}$—$(In_2O_3)_{70}$—$(ZrO_2)_{15}$ with the thickness changed for each sample within a range of 2 to 6 nm as shown in Table 6
Semi-transmissive reflective layer 32: Ag alloy (AgPdCu), 9.5 nm
Dielectric layer 31: $TiO_2$, 11 nm

[Evaluation]

Figure 8A:
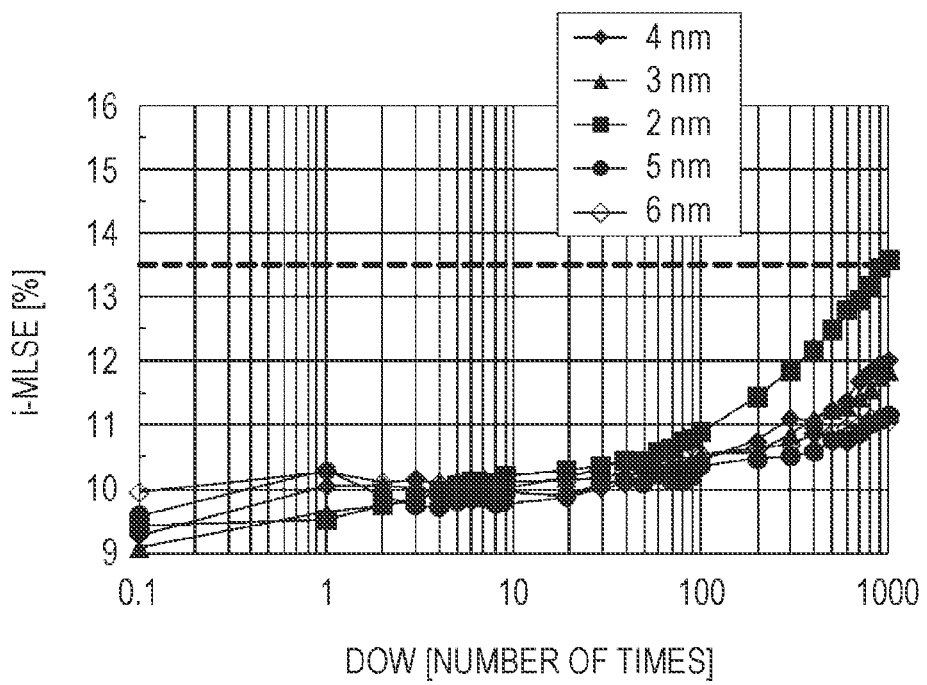
FIG. 8A is a graph showing evaluation results of DOW characteristics of optical recording media of Examples 3-1 to 3-5.
Figure 8B:
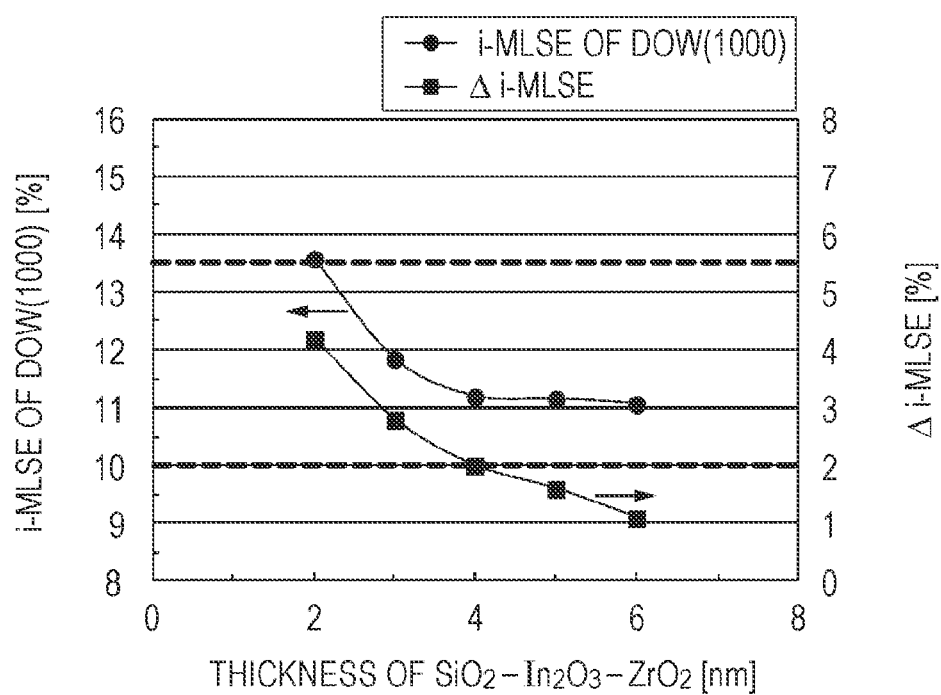
FIG. 8B is a graph showing evaluation results of i-MLSE and ΔiMLSE of DOW(1000) of optical recording media of Examples 3-1 to 3-5.

The DOW characteristics and ΔiMLSE(DOW) of the optical recording media 10 of Examples 3-1 to 3-5 produced as described above were evaluated by the same method as in Examples 2-1 to 2-6. The results are shown in FIGS. 8A and 8B and Table 6.

Table 6 shows the configurations and evaluation results of the second dielectric layers 33 of the recording layers L1 of the optical recoding media 10 of Examples 3-1 to 3-5.

TABLE 6

| | Second dielectric layer | | | | Evaluation result | |
| | Lower | | Upper | | i-MLSE of | |
| | Composition | Thickness [nm] | Composition | Thickness [nm] | DOW (1000) [%] | ΔiMLSE [%] |
|---|---|---|---|---|---|---|
| Example 3-1 | $(SiO_2)_{15}$— | 2 | $Ta_2O_5$ | 2 | 13.59 | 4.2 |
| Example 3-2 | $(In_2O_3)_{70}$— | 3 | | | 11.85 | 2.8 |
| Example 3-3 | $(ZrO_2)_{15}$ | 4 | | | 11.2 | 2 |
| Example 3-4 | | 5 | | | 11.16 | 1.6 |
| Example 3-5 | | 6 | | | 11.07 | 1.1 |

When $SiO_2$—$In_2O_3$—$ZrO_2$ is used as a material of the lower dielectric layer 33a, the DOW characteristics tend to be degraded by decreasing the thickness of the lower dielectric layer 33a.

With the lower dielectric layer 33a having a thickness of 3 nm or more, a value of iMLSE of DOW(1000) can be improved to 13.5% or less.

With the lower dielectric layer 33a having a thickness of 4 nm or more, a value of iMLSE of DOW(1000) can be improved to 13.5% or less, and a change ΔiMLSE(DOW) of DOW(1000) can be decreased to 2% or less.

Even the lower dielectric layer 33a having a larger thickness exceeding 6 nm causes no problem with optical characteristics and recording characteristics. However, in view of productivity (tact) and material cost, the thickness of the lower dielectric layer 33a is preferably 20 nm or less.

Therefore, the thickness of the lower dielectric layer 33a is preferably within a range of 3 nm or more and 20 nm or less and more preferably 4 nm or less and 10 nm or less.

VI. Relation Between Composition and Storage Reliability of Lower Dielectric Layer of Second Dielectric Layer

Reference Examples 4-1 to 4-4

A three-layer optical recording medium 10 was produced by the same method as in Reference Example 1-1 except that a recording layer L1 including a stacked film having compositions and thicknesses below was formed on an intermediate layer S1 by a sputtering method.

Upper dielectric layer 35c: SiN, 30 nm
Intermediate dielectric layer 35b: $(ZnS)_{80}$—$(SiO_2)_{20}$, 20 nm
Lower dielectric layer 35a: $(SiO_2)_{20}$—$(Cr_2O_3)_{30}$—$(ZrO_2)_{50}$, 2 nm
Phase-change recording layer 34: $Bi_{5.55}Ge_{43.06}Te_{51.39}$, 6.5 nm
Dielectric layer 33: dielectric layer with a composition changed for each sample as shown in Table 7, 4 nm
Semi-transmissive reflective layer 32: Ag alloy (AgPdCu), 9.5 nm
Dielectric layer 31: $TiO_2$, 11 nm Examples 4-1 to 4-6 and Reference Examples 4-5 to 4-7

A three-layer optical recording medium 10 was produced by the same method as in Reference Example 1-1 except that a recording layer L1 including a stacked film having compositions and thicknesses below was formed on an intermediate layer S1 by a sputtering method.

Upper dielectric layer 35c: SiN, 30 nm
Intermediate dielectric layer 35b: $(ZnS)_{80}$—$(SiO_2)_{20}$, 20 nm
Lower dielectric layer 35a: $(SiO_2)_{20}$—$(Cr_2O_3)_{30}$—$(ZrO_2)_{50}$, 2 nm Phase-change recording layer 34: $Bi_{5.55}Ge_{43.06}Te_{51.39}$, 6.5 nm
Upper dielectric layer 33b: dielectric layer with a composition changed for each sample as shown in Table 7, 2 nm
Lower dielectric layer 33a: dielectric layer with a composition changed for each sample as shown in Table 7, 4 nm
Semi-transmissive reflective layer 32: Ag alloy (AgPdCu), 9.5 nm
Dielectric layer 31: $TiO_2$, 11 nm

[Evaluation]

Each of the optical recording media 10 of Examples 4-1 to 4-6 and Reference Examples 4-1 to 4-7 produced as described above was stored in a constant-temperature oven at 80° C. and 85% for 200 hours to evaluate an increase in number of defects before and after storage. The number of defects was evaluated by observing a RF signal within a radius range of 30 mm to 35 mm by using a disc tester (manufactured by Pulstec Industrial Co., Ltd., trade name: DDU-1000) and determining a number of counts of dropout signals. The results are shown in Table 7.

Table 7 shows the configurations and evaluation results of the second dielectric layers 33 of the recording layers L1 of the optical recoding media 10 of Examples 4-1 to 4-6 and Reference Examples 4-1 to 4-7.

TABLE 7

| | | Second dielectric layer | | | Evaluation result Increase in number of defects |
|---|---|---|---|---|---|
| | Lower layer | | Upper layer | | |
| | Composition | Thickness [nm] | Composition | Thickness [nm] | [number of defects] |
| Reference Example 4-1 | ITO | 4 | — | — | 36 |
| Reference Example 4-2 | $Ta_2O_5$ | 4 | — | — | 25 |
| Reference Example 4-3 | $(SiO_2)_{15}$—$(In_2O_3)_{50}$—$(ZrO_2)_{35}$ | 4 | — | — | 22 |
| Reference Example 4-4 | $(SiO_2)_{35}$—$(In_2O_3)_{30}$—$(ZrO_2)_{35}$ | 4 | — | — | 20 |
| Reference Example 4-5 | ITO | 4 | $(SiO_2)_{15}$—$(In_2O_3)_{50}$—$(ZrO_2)_{35}$ | 2 | 88 |
| Example 4-1 | $(SiO_2)_{15}$—$(In_2O_3)_{50}$—$(ZrO_2)_{35}$ | 4 | $(SiO_2)_{35}$—$(In_2O_3)_{30}$—$(ZrO_2)_{35}$ | 2 | 18 |
| Example 4-2 | $(SiO_2)_{15}$—$(In_2O_3)_{70}$—$(ZrO_2)_{15}$ | 4 | $(SiO_2)_{35}$—$(In_2O_3)_{30}$—$(ZrO_2)_{35}$ | 2 | 16 |
| Example 4-3 | $(SiO_2)_{5}$—$(In_2O_3)_{90}$—$(ZrO_2)_{5}$ | 4 | $(SiO_2)_{35}$—$(In_2O_3)_{30}$—$(ZrO_2)_{35}$ | 2 | 19 |
| Example 4-4 | $(SiO_2)_{15}$—$(In_2O_3)_{70}$—$(ZrO_2)_{15}$ | 4 | $Ta_2O_5$ | 2 | 24 |
| Example 4-5 | $In_2O_3$—$Ga_2O_3$ | 4 | $Ta_2O_5$ | 2 | 22 |
| Example 4-6 | ZnO—$Al_2O_3$ | 4 | $Ta_2O_5$ | 2 | 25 |
| Reference Example 4-6 | SiN | 4 | $Ta_2O_5$ | 2 | 69 |
| Reference Example 4-7 | ITO | 4 | $Ta_2O_5$ | 2 | 92 |

Table 7 reveals the following.

Reference Example 4-1

When a dielectric layer having a single-layer structure containing ITO is used as the second dielectric layer 33, an increase in number of defects exceeds 30. With an increase in number of defects of 30 or less, deterioration of the error rate is suppressed and thus good long-term storage performance can be achieved.

Reference Examples 4-2, 4-3, and 4-4

When $Ta_2O_5$ or $(SiO_2)$—$(In_2O_3)$—$(ZrO_2)$ is used for the second dielectric layer 33, an increase in number of defects is 30 or less, and thus good storage reliability can be achieved.

However, in use of this configuration, good recording characteristics are not be achieved.

Examples 4-1 to 4-6

When the second dielectric layer 33 has a two-layer structure, and $(SiO_2)$—$(In_2O_3)$—$(ZrO_2)$, $In_2O_3$—$Ga_2O_3$, or ZnO—$Al_2O_3$ is used as a material of the lower dielectric layer 33a, an increase in number of defects can be decreased to 30 or less.

At a low In content, the crystallization promoting function is increased, but deterioration in the DOW characteristics tends to become significant due to low thermal conductivity. On the other hand, at a high In content, thermal conductivity is increased, but the crystallization promoting function is decreased, thereby possibly influencing recording of information signals.

Comparative Examples 4-5 to 4-7

When the second dielectric layer 33 has a two-layer structure, and ITO or SiN is used as a material of the lower dielectric layer 33a, an increase in number of defects exceeds 30.

Therefore, in view of storage reliability, it is preferred that the second dielectric layer 33 has a two-layer structure, and $(SiO_2)$—$(In_2O_3)$—$(ZrO_2)$, $In_2O_3$—$Ga_2O_3$, or ZnO—$Al_2O_3$ is used as a material of the lower dielectric layer 33a.

VII. Relation Between Composition and Signal Characteristics of Upper Dielectric Layer of Second Dielectric Layer Example 5-1

A recording layer L1 including a stacked film having compositions and thicknesses below was formed on an intermediate layer S1 by a sputtering method. Also, formation of an intermediate layer S2 and a recording layer L2 was omitted. A two-layer optical recording medium 10 was produced by the same method as in Reference Example 1-1 with the exception of the above.

Upper dielectric layer 35c: SiN, 30 nm
Intermediate dielectric layer 35b: $(ZnS)_{80}$—$(SiO_2)_{20}$, 20 nm
Lower dielectric layer 35a: $(SiO_2)_{20}$—$(Cr_2O_3)_{30}$—$(ZrO_2)_{50}$, 2 nm
Phase-change recording layer 34: $Bi_{5.05}$—$Ge_{42.94}$—$Te_{50.51}$—$Ag_{1.5}$, 6.8 nm
Upper dielectric layer 33b: $(SiO_2)_{35}$—$(In_2O_3)_{30}$—$(ZrO_2)_{35}$, 4 nm
Lower dielectric layer 33a: $(SiO_2)_{15}$—$(In_2O_3)_{70}$—$(ZrO_2)_{15}$, 4 nm
Semi-transmissive reflective layer 32: Ag alloy (AgPdCu), 9.5 nm
Dielectric layer 31: $TiO_2$, 12.5 nm Example 5-2

A recording layer L1 including a stacked film having compositions and thicknesses below was formed on an intermediate layer S1 by a sputtering method. Also, formation of an intermediate layer S2 and a recording layer L2 was omitted. A two-layer optical recording medium 10 was produced by the same method as in Reference Example 1-1 with the exception of the above.

Upper dielectric layer 35c: SiN, 30 nm
Intermediate dielectric layer 35b: $(ZnS)_{80}$—$(SiO_2)_{20}$, 20 nm
Lower dielectric layer 35a: $(SiO_2)_{20}$—$(Cr_2O_3)_{30}$—$(ZrO_2)_{50}$, 2 nm
Phase-change recording layer 34: $Bi_{5.0}Ge_{42.5}Te_{50.0}$—$Ag_{2.5}$, 6.5 nm
Upper dielectric layer 33b: $Ta_2O_5$, 2 nm
Lower dielectric layer 33a: $(SiO_2)_{15}$—$(In_2O_3)_{70}$—$(ZrO_2)_{15}$, 4 nm
Semi-transmissive reflective layer 32: Ag alloy (AgPdCu), 9.5 nm
Dielectric layer 31: $TiO_2$, 11 nm Example 5-3

A recording layer L1 including a stacked film having compositions and thicknesses below was formed on an intermediate layer S1 by a sputtering method. Also, formation of an intermediate layer S2 and a recording layer L2 was omitted. A two-layer optical recording medium 10 was produced by the same method as in Reference Example 1-1 with the exception of the above.

Upper dielectric layer 35c: SiN, 30 nm
Intermediate dielectric layer 35b: $(ZnS)_{80}$—$(SiO_2)_{20}$, 20 nm
Lower dielectric layer 35a: $(SiO_2)_{20}$—$(Cr_2O_3)_{30}$—$(ZrO_2)_{50}$, 2 nm
Phase-change recording layer 34: $Bi_{5.0}Ge_{42.5}Te_{50.0}$—$Ag_{2.5}$, 6.8 nm
Upper dielectric layer 33b: $Ta_2O_5$, 4 nm
Lower dielectric layer 33a: $(SiO_2)_{15}$—$(In_2O_3)_{70}$—$(ZrO_2)_{15}$, 4 nm
Semi-transmissive reflective layer 32: Ag alloy (AgPdCu), 9.5 nm
Dielectric layer 31: $TiO_2$, 12.5 nm

[Evaluation]

The optical characteristics and recorded signal quality of the optical recording media 10 of Examples 5-1 to 5-3 produced as described above were evaluated as follows.

(Optical Characteristics)
<Transmittance>
Transmittance of the recording layers L1 at a recording wavelength of 405 nm was measured by using a spectrophotometer (manufactured by JASCO, trade name: V-530). The results are shown in Table 8.

<Reflectance>
Reflectance of the recording layers L0 at NA=0.85 and a recording wavelength of 405 nm was measured by using a disc tester (manufactured by Pulstec Industrial Co., Ltd., trade name: ODU-1000). The results are shown in Table 8

Figure 9:
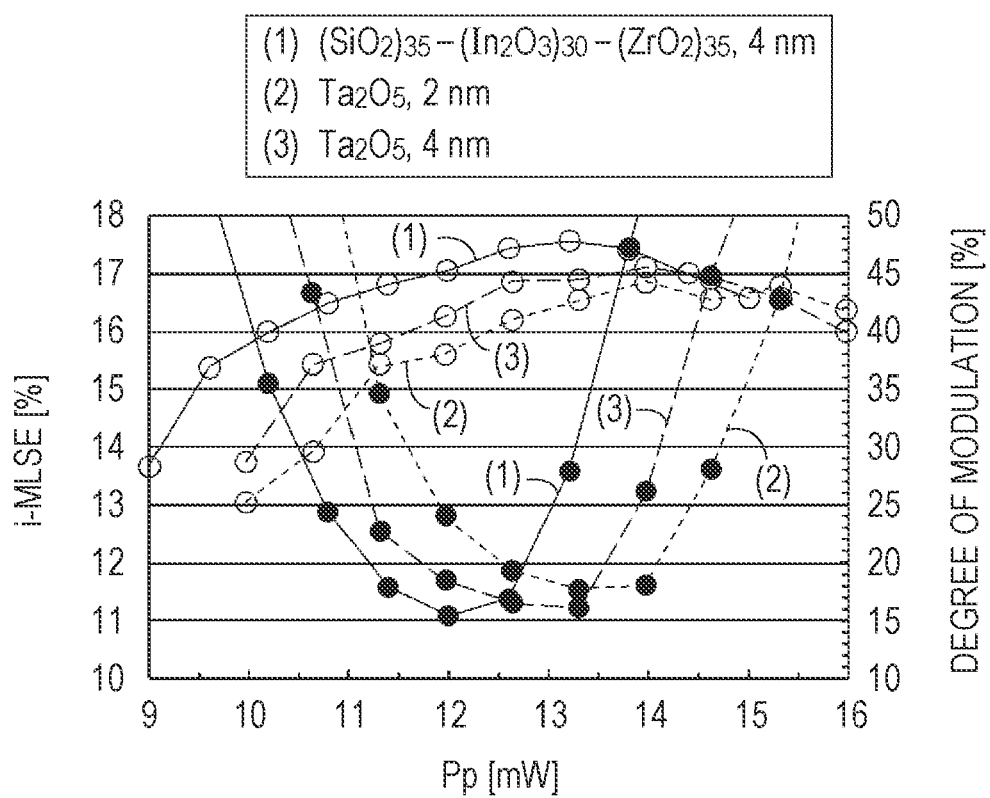
FIG. 9 is a graph showing recording power dependence of i-MLSE and degree of modulation of the optical recording media of Examples 5-1 to 5-3.

(Recorded Signal Quality)
Recorded signal quality of the recording layers L1 of the optical recording media 10 was evaluated by the same method as in Examples 2-1 to 2-8. The results are shown in FIG. 9.

Table 8 shows the evaluation results of optical characteristics of the optical recoding media 10 of Examples 5-1 to 5-3.

TABLE 8

| | Transmittance of recording layer L1 [%] | Reflectance of recording layer L0 [%] |
|---|---|---|
| Example 5-1 | 51 | 1.52 |
| Example 5-2 | 54 | 1.66 |
| Example 5-3 | 54 | 1.63 |

FIG. 9 and Table 8 reveal the following.

Even when any one of (SiO$_2$)—(In$_2$O$_3$)—(ZrO$_2$) and Ta$_2$O$_5$ is used as a material of the upper dielectric layer 33*b*, the bottom value of i-MLSE can be decreased. Also, the power margin can be improved.

When Ta$_2$O$_5$ is used as a material of the upper dielectric layer 33*b*, transmittance of the recording layer L1 and reflectance of the recording layer L0 can be improved as compared with when (SiO$_2$)—(In$_2$O$_3$)—(ZrO$_2$) is used as a material of the upper dielectric layer 33*b*.

Although the embodiments of the present disclosure are described in detail above, the present disclosure is not limited to the embodiments described above, and various modifications can be made based on the technical idea of the present disclosure.

For example, the configurations, methods, steps, shapes, materials, and numerical values given in the embodiments described above are merely examples, and configurations, methods, steps, shapes, materials, and numerical values different from those may be used according to demand.

Also, the configurations, methods, steps, shapes, materials, and numerical values described in the embodiments described above can be combined so as not to deviate from the gist of the present disclosure.

In addition, the above-described embodiments describe as an example the application of the present technology an optical recording medium having a configuration in which three recording layers and a light-transmissive layer are stacked in that order on a substrate, and information signals are recorded or reproduced by irradiating the three recording layers with a laser beam from the light-transmissive layer side. However, the present technology is not limited to this example. For example, the present technology can be applied to an optical recording medium having a configuration in which three recording layers and a protecting layer are stacked in that order on a substrate, and information signals are recorded or reproduced by irradiating the three recording layers with a laser beam from the substrate side or an optical recording medium having a configuration in which three recording layers are provided between two substrates, and information signals are recorded or reproduced by irradiating the three recording layers with a laser beam from at least one of the substrate sides.

Although the embodiments describe as an example the application of the present technology to an optical recording medium having three recording layers, the present technology can also be applied to an optical recording medium having a plurality of recording layers other than three layers.

The present technology can also use configurations below.

(1)

An optical recording medium including a recording layer including a reflective layer, two dielectric layers, and a phase-change recording layer, wherein the phase-change recording layer-side dielectric layer of the two dielectric layers contains tantalum oxide or a composite oxide composed of silicon oxide, indium oxide, and zirconium oxide, and the reflective layer-side dielectric layer of the two dielectric layers contains a composite oxide composed of silicon oxide, indium oxide, and zirconium oxide, a composite oxide composed of indium oxide and gallium oxide, or a composite oxide composed of zinc oxide and aluminum oxide.

(2)

The optical recording medium described in (1), wherein the phase-change recording layer contains bismuth, germanium, tellurium, and silver.

(3)

The optical recording medium described in (2), wherein a content of silver relative to a total amount of bismuth, germanium, tellurium, and silver is within a range of 2.0 atomic % or more and 3.5 atomic % or less.

(4)

The optical recording medium described in any one of (1) to (3), wherein the reflective layer-side dielectric layer of the two dielectric layers contains a composite oxide composed of silicon oxide, indium oxide, and zirconium oxide, and a content of indium relative to a total amount of silicon, indium, and zirconium is within a range of 66.7 atomic % or more and 94.7 atomic % or less.

(5)

The optical recording medium described in any one of (1) to (4), wherein the reflective layer-side dielectric layer of the two dielectric layers has a thickness within a range of 3 nm or more and 20 nm or less.

(6)

The optical recording medium described in any one of (1) to (5), wherein the phase-change recording layer-side dielectric layer of the two dielectric layers contains tantalum oxide.

(7)

The optical recording medium described in any one of (1) to (6), wherein the reflective layer contains silver.

(8)

The optical recording medium described in any one of (1) to (7), wherein the phase-change recording layer is a transmissive recording layer.

(9)

An optical recording medium including a recording layer including a first dielectric layer, a reflective layer, a second dielectric layer, a phase-change recording layer, and a third dielectric layer, wherein the second dielectric layer includes two dielectric layers, the phase-change recording layer-side dielectric layer of the two dielectric layers contains tantalum oxide or a composite oxide composed of silicon oxide, indium oxide, and zirconium oxide, and the reflective layer-side dielectric layer of the two dielectric layers contains a composite oxide composed of silicon oxide, indium oxide, and zirconium oxide, a composite oxide composed of indium oxide and gallium oxide, or a composite oxide composed of zinc oxide and aluminum oxide.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium comprising:
    a recording layer including a reflective layer, two dielectric layers, and a phase-change recording layer,
    wherein the phase-change recording layer-side dielectric layer of the two dielectric layers contains tantalum oxide or a composite oxide composed of silicon oxide, indium oxide, and zirconium oxide; and
    the reflective layer-side dielectric layer of the two dielectric layers contains a composite oxide composed of silicon oxide, indium oxide, and zirconium oxide, a composite oxide composed of indium oxide and gallium oxide, or a composite oxide composed of zinc oxide and aluminum oxide;
    wherein the phase-change recording layer contains bismuth, germanium, tellurium, and silver; and
    wherein a content of silver relative to a total amount of bismuth, germanium, tellurium, and silver is within a range of 2.0 atomic % or more and 3.5 atomic % or less.

2. The optical recording medium according to claim 1,
wherein the reflective layer-side dielectric layer of the two dielectric layers contains a composite oxide composed of silicon oxide, indium oxide, and zirconium oxide; and
a content of indium relative to a total amount of silicon, indium, and zirconium is within a range of 66.7 atomic % or more and 94.7 atomic % or less.

3. The optical recording medium according to claim 1, wherein the reflective layer-side dielectric layer of the two dielectric layers has a thickness within a range of 3 nm or more and 20 nm or less.

4. An optical recording medium comprising:
a recording layer including a reflective layer, two dielectric layers, and a phase-change recording layer,
wherein the phase-change recording layer-side dielectric layer of the two dielectric layers contains tantalum oxide or a composite oxide composed of silicon oxide, indium oxide, and zirconium oxide; and
the reflective layer-side dielectric layer of the two dielectric layers contains a composite oxide composed of silicon oxide, indium oxide, and zirconium oxide, a composite oxide composed of indium oxide and gallium oxide, or a composite oxide composed of zinc oxide and aluminum oxide wherein the phase-change recording layer-side dielectric layer of the two dielectric layers contains tantalum oxide.

5. The optical recording medium according to claim 1, wherein the reflective layer contains silver.

6. The optical recording medium according to claim 1, wherein the phase-change recording layer is a transmissive recording layer.

* * * * *